United States Patent
Suzuki et al.

(10) Patent No.: US 10,306,617 B2
(45) Date of Patent: May 28, 2019

(54) TERMINAL DEVICE, INTEGRATED CIRCUIT, AND COMMUNICATION METHOD

(71) Applicant: Sharp Kabushiki Kaisha, Sakai, Osaka (JP)

(72) Inventors: Shoichi Suzuki, Sakai (JP); Tatsushi Aiba, Sakai (JP); Shohei Yamada, Sakai (JP); Kazunari Yokomakura, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 44 days.

(21) Appl. No.: 15/518,504

(22) PCT Filed: Aug. 7, 2015

(86) PCT No.: PCT/JP2015/072493
§ 371 (c)(1),
(2) Date: Apr. 12, 2017

(87) PCT Pub. No.: WO2016/063599
PCT Pub. Date: Apr. 28, 2016

(65) Prior Publication Data
US 2017/0245247 A1    Aug. 24, 2017

(30) Foreign Application Priority Data
Oct. 24, 2014  (JP) ................. 2014-216788

(51) Int. Cl.
*H04W 72/04* (2009.01)
*H04W 92/18* (2009.01)
(Continued)

(52) U.S. Cl.
CPC ......... *H04W 72/042* (2013.01); *H04L 1/0061* (2013.01); *H04L 5/0042* (2013.01);
(Continued)

(58) Field of Classification Search
CPC ............... H04W 72/042; H04W 72/04; H04W 72/1273; H04W 72/1289; H04W 76/14;
(Continued)

(56) References Cited

U.S. PATENT DOCUMENTS

2014/0226609 A1*  8/2014  Hooli ............... H04W 16/14
                                                           370/329
2015/0110038 A1*  4/2015  Yang .................. H04W 72/042
                                                           370/329

OTHER PUBLICATIONS

Ericsson et al., "D2D for LTE Proximity Services: Overview", 3GPP TSG-RAN WG1 #73, R1-132028, May 20-24, 2013, pp. 1-6.
(Continued)

*Primary Examiner* — Chi Tang P Cheng
(74) *Attorney, Agent, or Firm* — Keating & Bennett, LLP

(57) ABSTRACT

Provided is a terminal device communicating with an EUTRAN. The terminal device simultaneously receives, in the same subframe, a PBCH, a PDCCH, and a PDSCH in a downlink in a serving cell, a PBCH, a PDCCH, and a PDSCH in the downlink in a non-serving cell, and a physical channel in the non-serving cell in a sidelink, and monitors the PDCCH in a common search space in the downlink of the non-serving cell upon being configured to decode the physical channel in the sidelink in the non-serving cell.

12 Claims, 13 Drawing Sheets

(51) Int. Cl.
  *H04W 76/14* (2018.01)
  *H04L 1/00* (2006.01)
  *H04W 24/08* (2009.01)
  *H04W 72/12* (2009.01)
  *H04L 5/00* (2006.01)

(52) U.S. Cl.
  CPC ........... *H04L 5/0094* (2013.01); *H04W 24/08* (2013.01); *H04W 72/04* (2013.01); *H04W 72/1273* (2013.01); *H04W 72/1289* (2013.01); *H04W 76/14* (2018.02); *H04W 92/18* (2013.01); *H04L 5/001* (2013.01)

(58) Field of Classification Search
  CPC .... H04W 24/08; H04W 92/18; H04L 5/0042; H04L 5/0094; H04L 5/001
  USPC ......................................................... 370/336
  See application file for complete search history.

(56) References Cited

OTHER PUBLICATIONS

"D2D capability for multi-carrier capable UE", 3GPP TSG-RAN WG2 #86, R2-142634, May 19-23, 2014, pp. 1-3.
Kyocera, "Intra-frequency and inter-frequency neighbor cell support", 3GPP TSG-RAN WG2 #87, R2-143755, Aug. 17-22, 2014, pp. 1-4.
Ericsson, "Discussion on UE Multi-Carrier D2D Capabilities", 3GPP TSG RAN WG1 Meeting #77, R1-142407, May 19-23, 2014, pp. 1-5.

* cited by examiner

| SupportedBandCombinat ion-r10 (RF-Parameters-r10) | BandCombinationParam eters-r10 (BCP100) | BandParameters-r10 | bandEUTRA-r10 | | FreqBandIndicator | Band A |
|---|---|---|---|---|---|---|
| | | | bandParametersUL-r10 | CA-MIMO-ParametersUL-r10 | ca-BandwidthClassUL-r10 | a (1) |
| | | | bandParametersDL-r10 | CA-MIMO-ParametersDL-r10 | ca-BandwidthClassDL-r10 | a (1) |
| | | | | | supportedMIMO-CapabilityDL-r10 | twoLayers (2) |
| | | BandParameters-r10 | bandEUTRA-r10 | | FreqBandIndicator | Band B |
| | | | bandParametersUL-r10 | CA-MIMO-ParametersUL-r10 | ca-BandwidthClassUL-r10 | a (1) |
| | | | bandParametersDL-r10 | CA-MIMO-ParametersDL-r10 | ca-BandwidthClassDL-r10 | a (1) |
| | | | | | supportedMIMO-CapabilityDL-r10 | twoLayers (2) |
| | BandCombinationParam eters-r10 (BCP200) | | | .. | | |
| | BandCombinationParam eters-r10 (BCP300) | BandParameters-r10 | bandEUTRA-r10 | | FreqBandIndicator | Band A |
| | | | bandParametersUL-r10 | CA-MIMO-ParametersUL-r10 | ca-BandwidthClassUL-r10 | a (1) |
| | | | bandParametersDL-r10 | CA-MIMO-ParametersDL-r10 | ca-BandwidthClassDL-r10 | a (1) |
| | | BandParameters-r10 | bandEUTRA-r10 | | FreqBandIndicator | Band B |
| | | | bandParametersDL-r10 | CA-MIMO-ParametersDL-r10 | ca-BandwidthClassDL-r10 | a (1) |

FIG. 6

TERMINAL DEVICE, INTEGRATED CIRCUIT, AND COMMUNICATION METHOD

TECHNICAL FIELD

The present invention relates to a terminal device, an integrated circuit, and a communication method.

This application claims priority based on Japanese Patent Application No. 2014-216788 filed on Oct. 24, 2014, the contents of which are incorporated herein by reference.

BACKGROUND ART

In the 3rd Generation Partnership Project (3GPP), a radio access method (Evolved Universal Terrestrial Radio Access (EUTRA)) and a radio access network (Evolved Universal Terrestrial Radio Access Network (EUTRAN)) for cellular mobile communications are being considered. EUTRA and EUTRAN are also referred to as Long Term Evolution (LTE). In LTE, a base station device is also referred to as an evolved NodeB (eNodeB), and a terminal device is also referred to as user equipment (UE). LTE is a cellular communication system in which an area is divided into a plurality of cells to form a cellular pattern, each of the cells being served by a base station device. A single base station device may manage a plurality of cells.

In 3GPP, proximity based services (ProSe) is being considered. ProSe includes ProSe discovery and ProSe communication. ProSe discovery is a process that identifies that a terminal device is in proximity of a different terminal device, using EUTRA. ProSe communication is communication between two terminal devices that are in proximity of each other, through an EUTRAN communication path established between the two terminal devices. For example, the communication path may be established directly between the terminal devices.

ProSe discovery and ProSe communication are also referred to as device to device (D2D) discovery and D2D communication, respectively. Furthermore, ProSe discovery and ProSe communication are collectively referred to as ProSe. Moreover, D2D discovery and D2D communication are collectively referred to as D2D. A communication path is also referred to as a link.

NPL 1 describes that a subset of resource blocks is reserved for D2D, a network configures a set of D2D resources, and a terminal device is allowed to transmit a D2D signal with the configured resources.

CITATION LIST

Non Patent Literature

NPL 1: "D2D for LTE Proximity Services: Overview", R1-132028, 3GPP TSG-RAN WG1 Meeting #73, 20 to 24 May 2013.

SUMMARY OF INVENTION

Technical Problem

However, sufficient consideration has not been given to a terminal device that performs D2D and cellular communication simultaneously. In light of the foregoing problem, an object of the present invention is to provide a terminal device, an integrated circuit mounted on the terminal device, and a communication method used by the terminal device that enable efficient D2D.

Solution to Problem (1) In order to accomplish the object described above, aspects of the present invention are contrived to provide the following means. A first aspect of the present invention is a terminal device communicating with an Evolved Universal Terrestrial Radio Access Network (EUTRAN). The terminal device includes a reception unit simultaneously receives, in the same subframe, a PBCH, a PDCCH, and a PDSCH in a downlink in a serving cell, a PBCH, a PDCCH, and a PDSCH in the downlink in a non-serving cell other than the serving cell, and a physical channel in a link between terminal devices in the non-serving cell. The reception unit monitors the PDCCH in a common search space in the downlink of the non-serving cell when a configuration for decoding the physical channel in the link between the terminal devices in the non-serving cell is made.

(2) In the first aspect of the present invention, the terminal device 1 includes a transmission unit that transmits the physical channel in the link between the terminal devices in the non-serving cell. The reception unit monitors the PDCCH in the common search space in the downlink of the non-serving cell when a configuration for transmitting the physical channel in the link between the terminal devices in the non-serving cell is made.

(3) A second aspect of the present invention is a communication method used by a terminal device communicating with an Evolved Universal Terrestrial Radio Access Network (EUTRAN). The communication method includes the step of simultaneously receiving, in the same subframe, a PBCH, a PDCCH, and a PDSCH in a downlink in a serving cell, a PBCH, a PDCCH, and a PDSCH in the downlink in a non-serving cell other than the serving cell, and a physical channel in a link between terminal devices in the non-serving cell. The PDCCH in a common search space in the downlink of the non-serving cell is monitored when a configuration for decoding the physical channel in the link between the terminal devices in the non-serving cell is made.

(4) In the second aspect of the present invention, the physical channel is transmitted in the link between the terminal devices in the non-serving cell. The reception unit monitors the PDCCH in the common search space in the downlink of the non-serving cell when a configuration for transmitting the physical channel in the link between the terminal devices in the non-serving cell is made.

A third aspect of the present invention is an integrated circuit mounted on a terminal device communicating with an Evolved Universal Terrestrial Radio Access Network (EUTRAN). The integrated circuit causes the terminal device to perform in series: simultaneously receiving, in the same subframe, a PBCH, a PDCCH, and a PDSCH in a downlink in a serving cell, a PBCH, a PDCCH, and a PDSCH in the downlink in a non-serving cell other than the serving cell, and a physical channel in a link between terminal devices in the non-serving cell; and monitoring the PDCCH in a common search space in the downlink of the non-serving cell when a configuration for decoding the physical channel in the link between the terminal devices in the non-serving cell is made.

(6) In the third aspect of the present invention, the terminal device is caused to further perform: transmitting the physical channel in the link between the terminal devices in the non-serving cell. The reception unit monitors the PDCCH in the common search space in the downlink of the non-serving cell when a configuration for transmitting the physical channel in the link between the terminal devices in the non-serving cell is made.

Advantageous Effects of Invention

According to the present invention, the terminal device can perform D2D efficiently.

BRIEF DESCRIPTION OF DRAWINGS

FIG. 6 is a diagram illustrating an example of RF-Parameters-r10 according to the present embodiment.

DESCRIPTION OF EMBODIMENTS

Embodiments of the present invention will be described below.

Figure 1:
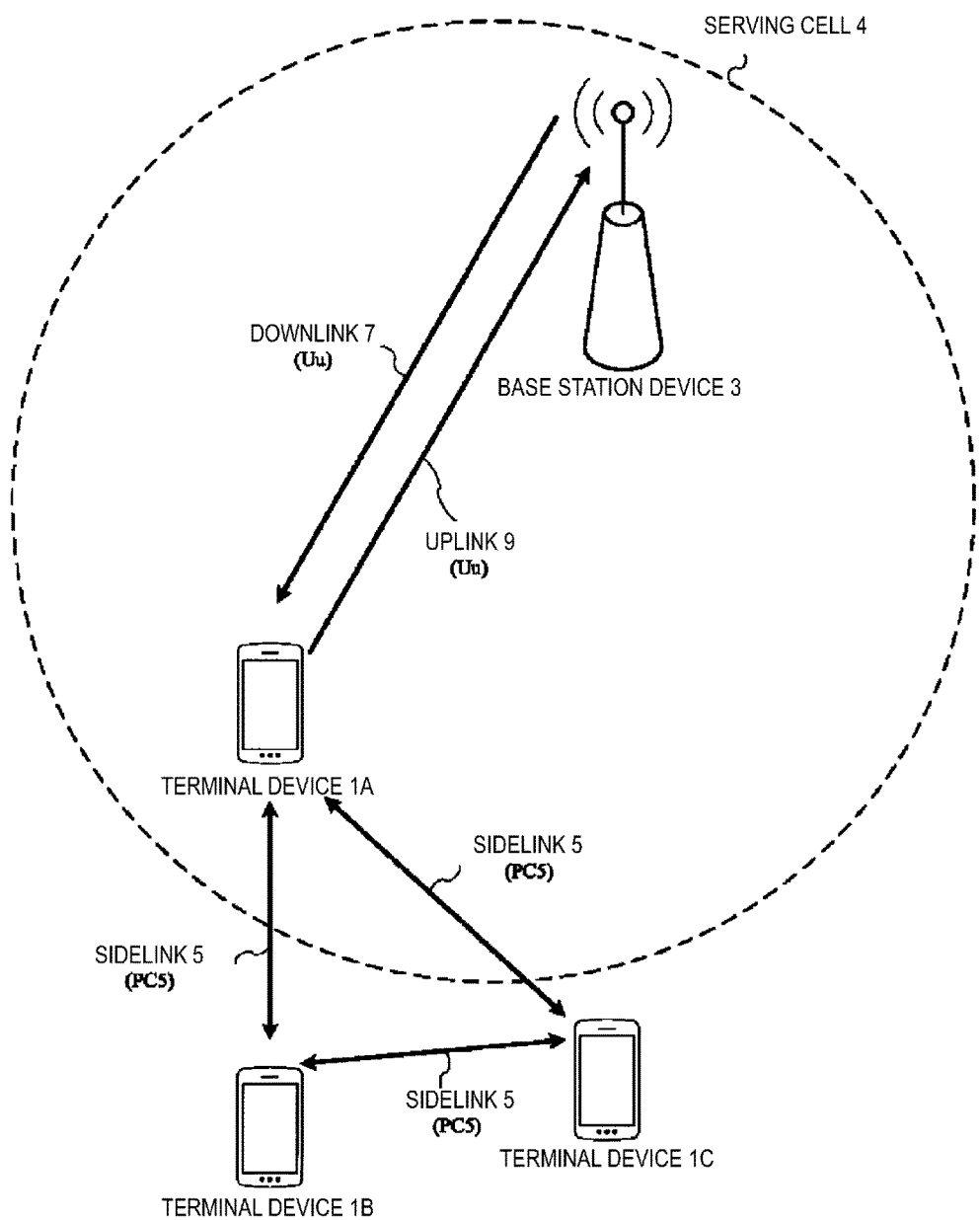
FIG. 1 is a conceptual diagram of a radio communication system according to the present embodiment.

FIG. 1 is a conceptual diagram of the radio communication system according to the present embodiment. In FIG. 1, a radio communication system includes terminal devices 1A to 1C and a base station device 3. The terminal devices 1A to 1C are each referred to as a terminal device 1. A serving cell 4 indicates an area covered by (coverage of) the base station device 3 (LTE or EUTRAN). The terminal device 1A is in-coverage of EUTRAN. The terminal device 1B and the terminal device 1C are out-of-coverage of EUTRAN.

A sidelink 5 is a link between the terminal devices 1. Note that the sidelink 5 may be referred to as a PC5, a D2D communication path, a ProSe link, or a ProSe communication path. In the sidelink 5, D2D discovery and D2D communication are performed. D2D discovery is a process/procedure that identifies that the terminal device 1 is in proximity of a different terminal device, using EUTRA. D2D communication is communication between the plurality of terminal devices 1 that are in proximity to each other, the communication being performed through the EUTRAN communication path established between the plurality of terminal devices 1. For example, the communication path may be established directly between the terminal devices 1.

A downlink 7 is a link from the base station device 3 to the terminal device 1. An uplink 9 is a link from the terminal device 1 to the base station device 3. Note that, in the uplink 9, a signal may be transmitted directly from the terminal device 1 to the base station device 3 without using any repeater. Furthermore, the uplink 5 and the downlink 7 may be collectively referred to as a Uu, a cellular link, or a cellular communication path. Moreover, communication between the terminal device 1 and the base station device 3 may be referred to as cellular communication or communication with EUTRAN.

Physical channels and physical signals according to the present embodiment will be described.

A downlink physical channel and a downlink physical signal are collectively referred to as a downlink signal. An uplink physical channel and an uplink physical signal are collectively referred to as an uplink signal. A D2D physical channel and a D2D physical signal are collectively referred to as a D2D signal. The physical channel is used for transmission of information output from a higher layer. The physical signal is not used for transmission of the information output from the higher layer but is used by the physical layer.

In FIG. 1, the following D2D physical channels are used in the radio communication in the D2D links 9 between the terminal devices 1.

Physical sidelink broadcast channel (PSBCH)
Physical sidelink control channel (PSCCH)
Physical sidelink shared channel (PSSCH)
Physical sidelink discovery channel (PSDCH)

The PSBCH is used for transmission of information indicating a frame number for D2D. The PSCCH is used for transmission of sidelink control information (SCI). The SCI is used for scheduling of the PSSCH. The PSSCH is used for transmission of D2D communication data, namely sidelink shared channel (SL-SCH). The PSDCH is used for transmission of D2D discovery data, namely sidelink discovery channel (SL-DCH).

In FIG. 1, the following D2D physical signals are used in D2D radio communication.

Sidelink synchronization signal
Sidelink demodulation reference signal

From the viewpoint of the terminal device 1 that performs transmission, the terminal device 1 can operate in two modes (mode 1 and mode 2) for resource allocation in D2D communication.

In mode 1, EUTRAN (base station device 3) schedules specific resources to be used by the terminal device 1 to transmit a communication signal (D2D data and D2DSA).

In mode 2, the terminal device 1 selects resources from a resource pool for transmission of a communication signal (D2D data and D2DSA). The resource pool is a set of resources. The resource pool for mode 2 may be configured/restricted in a semi-static manner by EUTRAN (base station device 3). Alternatively, the resource pool for mode 2 may be pre-configured.

The terminal device 1 that is capable of D2D communication and is in-coverage of EUTRAN may support mode 1 and mode 2. The terminal device 1 that is capable of D2D communication and is out-of-coverage of EUTRAN may support mode 2 only.

Two types (type 1 and type 2) of D2D discovery procedure are defined.

The D2D discovery procedure of type 1 is a D2D discovery procedure in which resources for discovery signals are not allocated individually to the terminal devices 1. In other words, in the D2D discovery procedure of type 1, resources for discovery signals may be allocated to all the terminal devices 1 or a group of the terminal devices 1.

The D2D discovery procedure of type 2 is a D2D discovery procedure in which resources for discovery signals are allocated individually to the terminal devices 1. The discovery procedure in which resources are allocated individually to transmission instances of a discovery signal is referred to as a type 2A discovery procedure. A discovery procedure of type 2 in which resources are semi-persistently allocated for transmission of a discovery signal is referred to as a type 2B discovery procedure.

In FIG. 1, the following uplink physical channels are used in the uplink radio communication.

Physical uplink control channel (PUCCH)
Physical uplink shared channel (PUSCH)
Physical random access channel (PRACH)

In FIG. 1, the following uplink physical signal is used in the uplink radio communication.

Uplink reference signal (UL RS)

In FIG. 1, in the downlink radio communication, the following downlink physical channels are used.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

In FIG. 1, in the downlink radio communication, the following downlink physical signals are used.

Synchronization signal (SS)
Downlink reference signal (DL RS)

The SL-SCH and the SL-DCH are transport channels. The PUSCH, the PBCH, the PDSCH, and the PMCH are used for carrying a transport channel. A channel used in a medium access control (MAC) layer is referred to as a transport channel. The unit of data on the transport channel used in the MAC layer is referred to as a transport block (TB) or a MAC protocol data unit (PDU). Control of a hybrid automatic repeat request (HARQ) is performed on each transport block in the MAC layer. The transport block is a unit of data that the MAC layer delivers to the physical layer. In the physical layer, the transport block is mapped to a codeword, and coding processing is performed on a codeword-by-codeword basis.

A configuration of a device according to the present embodiment will be described below.

Figure 2:
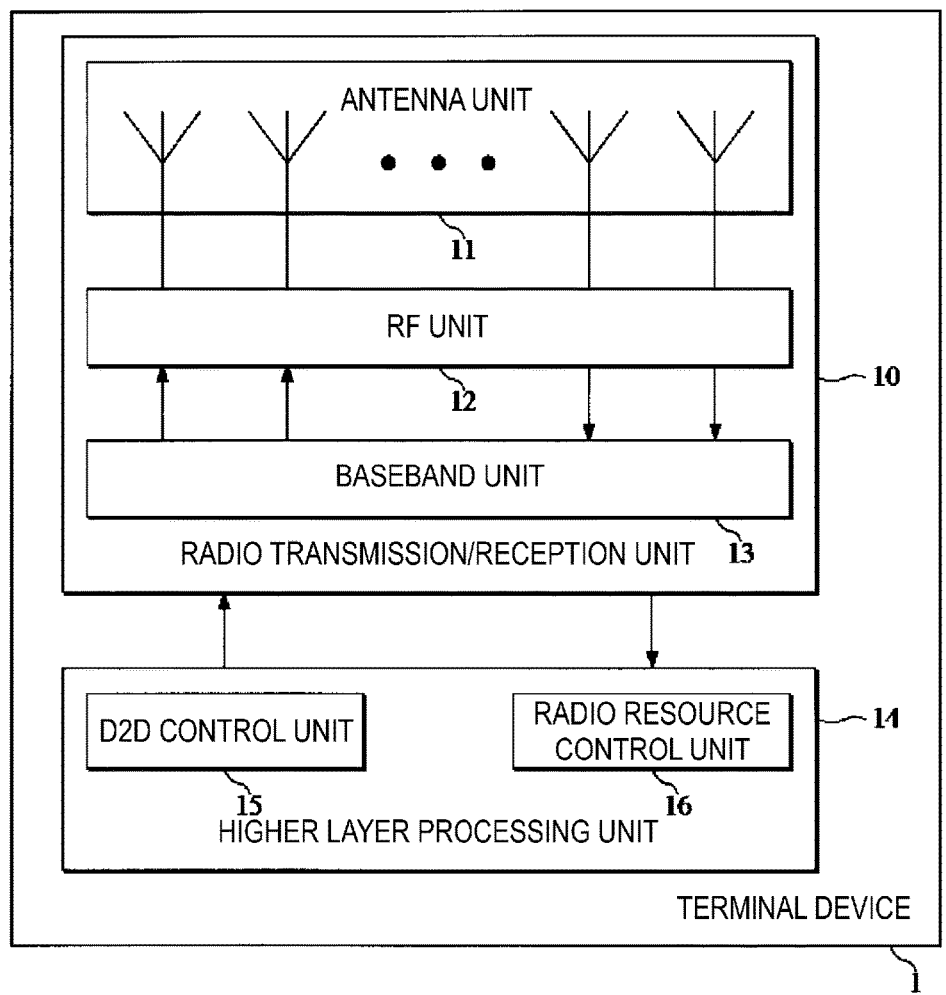
FIG. 2 is a schematic block diagram illustrating a configuration of a terminal device 1 according to the present embodiment.

FIG. 2 is a schematic block diagram illustrating a configuration of the terminal device 1 according to the present embodiment. As illustrated, the terminal device 1 is configured to include a radio transmission/reception unit 10 and a higher layer processing unit 14. The radio transmission/reception unit 10 is configured to include an antenna unit 11, a radio frequency (RF) unit 12, and a baseband unit 13. The higher layer processing unit 14 is configured to include a D2D control unit 15 and a radio resource control unit 16. The radio transmission/reception unit 10 is also referred to as a transmission unit or a reception unit.

The higher layer processing unit 14 outputs uplink data (transport block) generated by a user operation or the like, to the radio transmission/reception unit 10. The higher layer processing unit 14 performs processing of the medium access control (MAC) layer, the packet data convergence protocol (PDCP) layer, the radio link control (RLC) layer, and the radio resource control (RRC) layer.

The radio resource control unit 16 included in the higher layer processing unit 14 manages various configuration information/parameters of the terminal device 1 itself. The radio resource control unit 16 sets the various configuration information/parameters in accordance with a higher layer signal received from the base station device 3. Specifically, the radio resource control unit 16 sets the various configuration information/parameters in accordance with the information indicating the various configuration information/parameters received from the base station device 3.

The D2D control unit 15 included in the higher layer processing unit 14 controls D2D discovery and/or D2D communication in accordance with the various configuration information/parameters managed by the radio resource control unit 16. The D2D control unit 15 may generate information associated with D2D to be transmitted to a different terminal device 1 or EUTRAN (base station device 3). The D2D control unit 15 manages information indicating whether there is interest in transmission of D2D discovery, reception/monitoring of D2D discovery, transmission of D2D communication, and/or reception/monitoring of D2D communication.

The radio transmission/reception unit 10 performs processing of the physical layer, such as modulation, demodulation, coding, and decoding. The radio transmission/reception unit 10 demultiplexes, demodulates, and decodes a signal received from the base station device 3, and outputs the information resulting from the decoding to the higher layer processing unit 14. The radio transmission/reception unit 10 modulates and codes data to generate a transmit signal, and transmits the transmit signal to the base station device 3.

The RF unit 12 converts (down-converts) a signal received through the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a cyclic prefix (CP) from the digital signal resulting from the conversion, performs fast Fourier transform (FFT) on the signal from which the CP has been removed, and extracts a signal in the frequency domain.

The baseband unit 13 performs inverse fast Fourier transform (IFFT) on data, generates an SC-FDMA symbol, attaches a CP to the generated SC-FDMA symbol, generates a digital signal in a baseband, and converts the digital signal in the baseband into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11.

Figure 3:
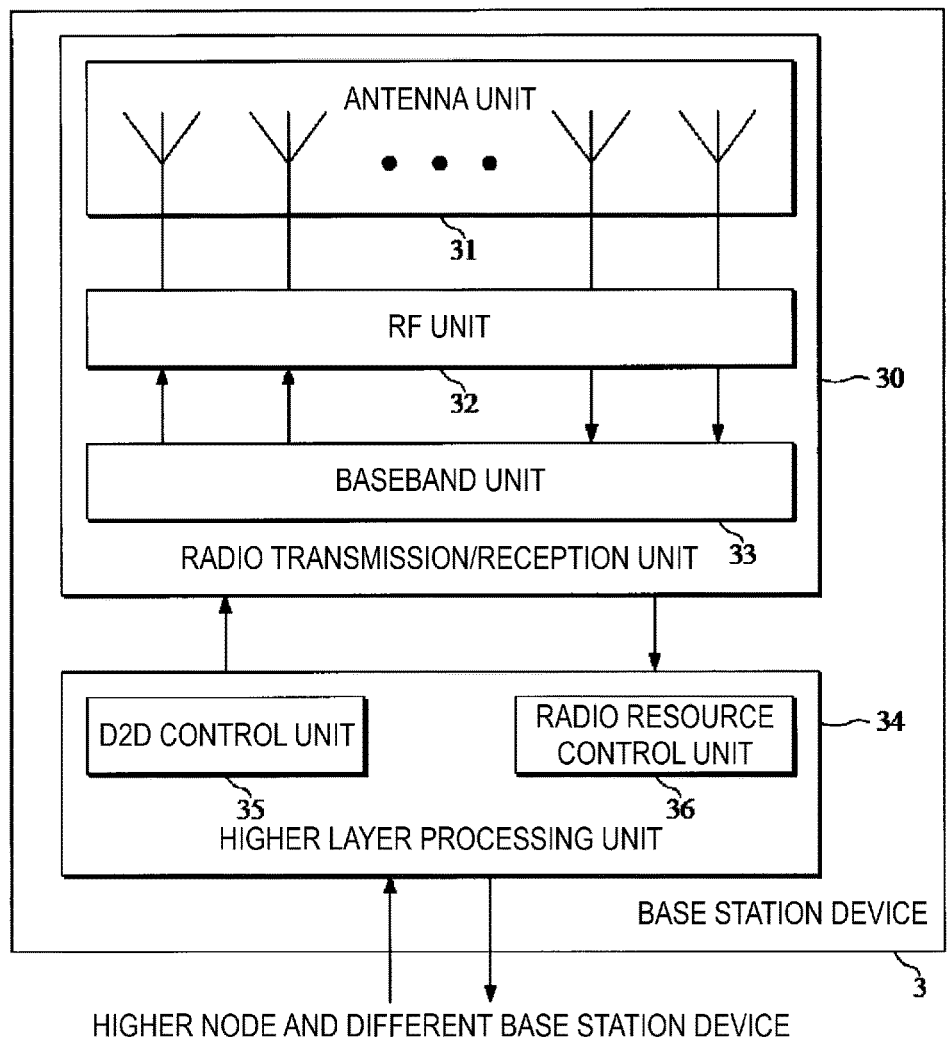
FIG. 3 is a schematic block diagram illustrating a configuration of a base station device 3 according to the present embodiment.

FIG. 3 is a schematic block diagram illustrating a configuration of the base station device 3 according to the present embodiment. As illustrated, the base station device 3 is configured to include a radio transmission/reception unit 30 and a higher layer processing unit 34. The radio transmission/reception unit 30 is configured to include an antenna unit 31, an RF unit 32, and a baseband unit 33. The higher layer processing unit 34 is configured to include a D2D control unit 35 and a radio resource control unit 36. The radio transmission/reception unit 30 is also referred to as a transmission unit or a reception unit.

The higher layer processing unit 34 performs processing of the medium access control (MAC) layer, the packet data convergence protocol (PDCP) layer, the radio link control (RLC) layer, and the radio resource control (RRC) layer.

The D2D control unit 35 included in the higher layer processing unit 34 controls D2D discovery and/or D2D communication in the terminal device 1 communicating through a cellular link, in accordance with the various configuration information/parameters managed by the radio resource control unit 36. The D2D control unit 35 may generate information associated with D2D to be transmitted to a different base station device 3 and/or the terminal device 1.

The radio resource control unit 36 included in the higher layer processing unit 34 generates, or acquires from a higher node, downlink data (transport block) arranged on a physical downlink channel, system information, an RRC message, a MAC control element (CE), and the like, and outputs the generated or acquired data to the radio transmission/reception unit 30. Furthermore, the radio resource control unit 36 manages various configuration information/parameters for each of the terminal devices 1. The radio resource control unit 36 may set various configuration information/parameters for each of the terminal devices 1 via a higher layer signal. In other words, the radio resource control unit 36 transmits/broadcasts information indicating various configuration information/parameters.

The capability of the radio transmission/reception unit 30 is similar to that of the radio transmission/reception unit 10, and hence description thereof is omitted.

In the present embodiment, one or a plurality of serving cells are configured for the terminal device 1 in the cellular link. A technology in which the terminal device 1 communicates with the base station device 3 via a plurality of serving cells in the cellular link is referred to as cell aggregation or carrier aggregation. The serving cell is used for EUTRAN communication.

The configured plurality of serving cells include one primary cell and one or a plurality of secondary cells. The primary cell is a serving cell in which an initial connection establishment procedure has been performed, a serving cell in which a connection re-establishment procedure has been started, or a cell indicated as a primary cell during a handover procedure. At the point of time when a radio resource control (RRC) connection is established, or later, a secondary cell may be configured.

For cell aggregation, a time division duplex (TDD) scheme or a frequency division duplex (FDD) scheme may be applied to all the plurality of serving cells. Cells to which the TDD scheme is applied and serving cells to which the FDD scheme is applied may be aggregated.

However, the capability of the radio transmission/reception unit 10 varies among the terminal devices 1. In other words, the band (carrier, frequency) combination to which carrier aggregation is applicable varies among the terminal devices 1. For this reason, each of the terminal devices 1 transmits information/parameters RF-Parameters-r10 indicating the band combination to which carrier aggregation is applicable, to the base station device 3. Hereinafter, the band to which carrier aggregation is applicable is also referred to as a CA band. A band to which carrier aggregation is not applicable or a band to which carrier aggregation is applicable but is not applied is also referred to as a non-CA band.

Figure 4:
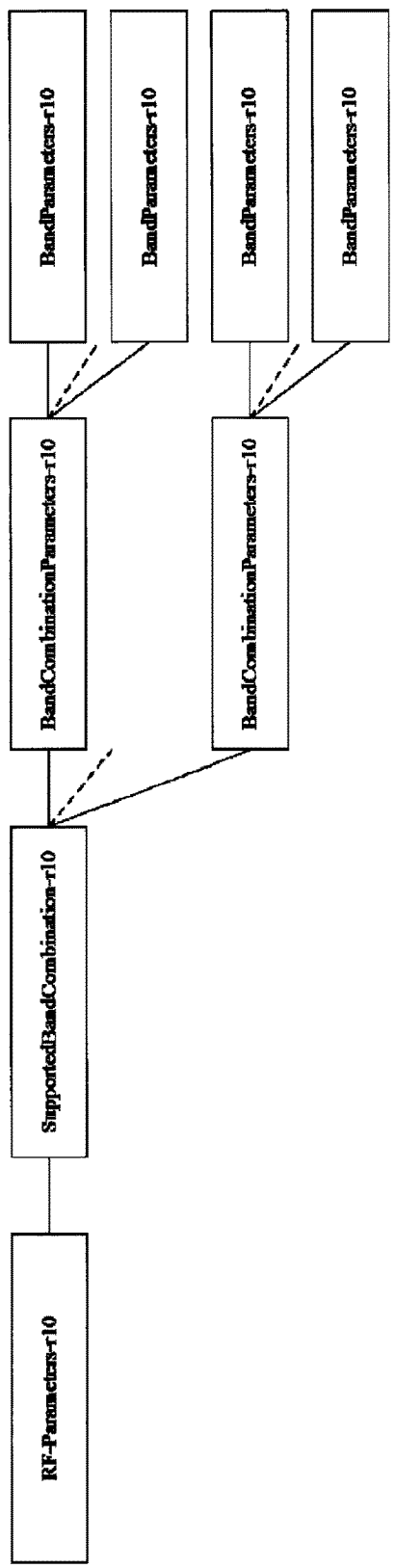
FIG. 4 is a diagram illustrating information/parameters included in RF-Parameters-r10 according to the present embodiment.

FIG. 4 is a diagram illustrating information/parameters included in RF-Parameters-r10 according to the present embodiment. RF-Parameters-r10 includes one SupportedBandCombination-r10. SupportedBandCombination-r10 includes one or a plurality of BandCombinationParameters-r10. SupportedBandCombination-r10 includes a supported CA band combination and a supported non-CA band.

BandCombinationParameters-r10 includes one or a plurality of BandParameters-r10. Each BandCombinationParameters-r10 indicates a supported CA band combination or a supported non-CA band. For example, when BandCombinationParameters-r10 includes a plurality of BandParameters-r10, communication to which carrier aggregation with the combination of CA bands indicated by the plurality of BandParameters-r10 is applied is supported. When BandCombinationParameters-r10 includes one BandParameters-r10, communication in the band (non-CA band) indicated by the one BandParameters-r10 is supported.

Figure 5:
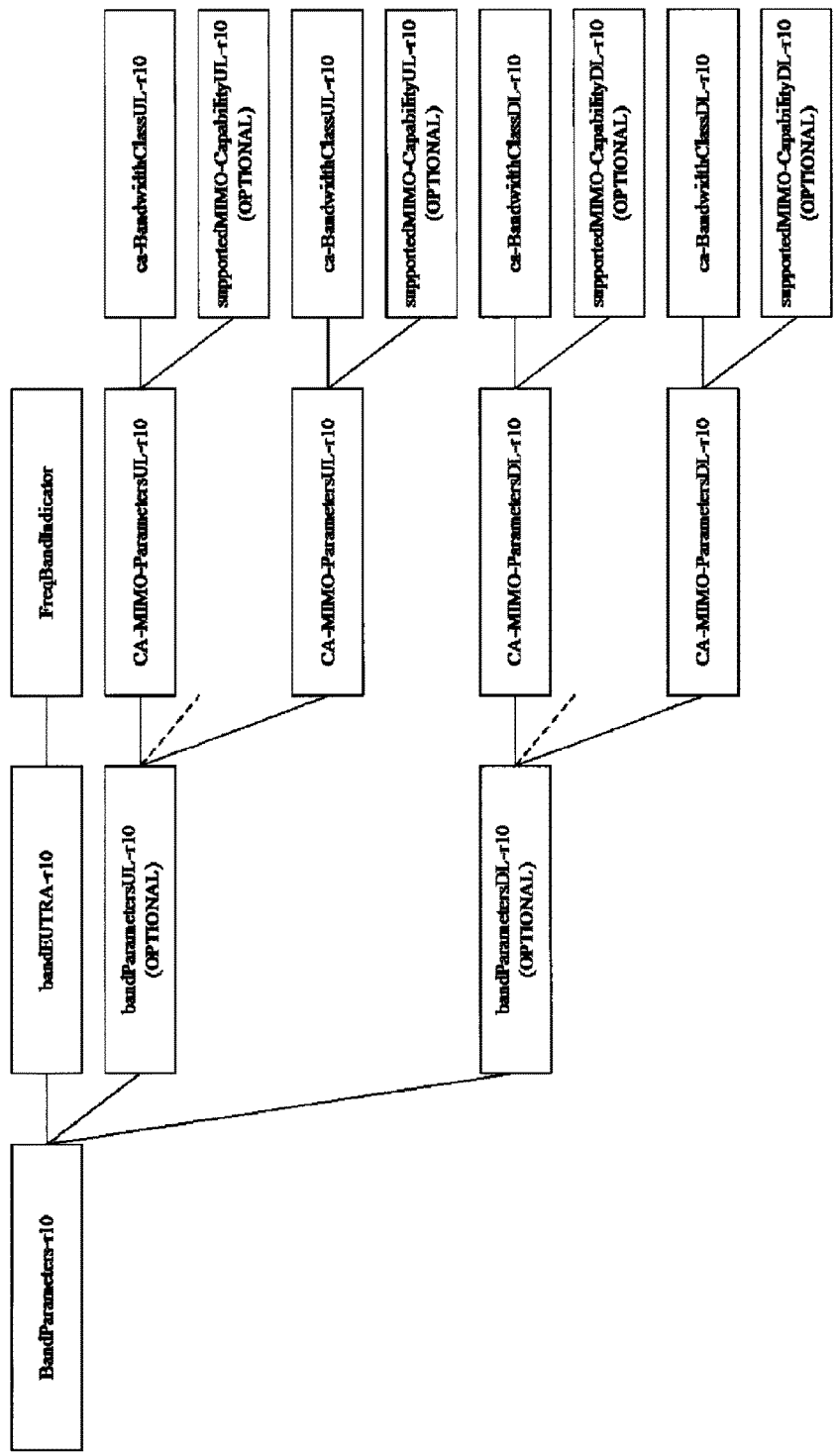
FIG. 5 is a diagram illustrating information/parameters included in BandParameters-r10 according to the present embodiment.

FIG. 5 is a diagram illustrating information/parameters included in BandParameters-r10 according to the present embodiment. BandParameters-r10 includes bandEUTRA-r10, bandParametersUL-r10, and bandParametersDL-r10.

bandEUTRA-r10 includes FreqBandIndicator. FreqBandIndicator indicates a band. When the terminal device 1 is not capable of transmitting an uplink signal in the band indicated by FreqBandIndicator, BandParameters-r10 does not include bandParametersUL-r10. When the terminal device 1 is not capable of receiving a downlink signal in the band indicated by FreqBandIndicator, BandParameters-r10 does not include bandParametersDL-r10.

bandParametersUL-r10 includes one or a plurality of CA-MIMO-ParametersUL-r10. CA-MIMO-ParametersUL-r10 includes ca-BandwidthClassUL-r10 and supportedMIMO-CapabilityUL-r10. ca-BandwidthClassUL-r10 includes CA-BandwidthClass-r10.

supportedMIMO-CapabilityUL-r10 indicates the number of layers supported for spatial multiplexing in the uplink. When spatial multiplexing is not supported in the uplink, CA-MIMO-ParametersUL-r10 does not include supportedMIMO-CapabilityUL-r10.

bandParametersDL-r10 includes one or a plurality of CA-MIMO-ParametersDL-r10. CA-MIMO-ParametersDL-r10 includes ca-BandwidthClassDL-r10 and supportedMIMO-CapabilityDL-r10. ca-BandwidthClassDL-r10 includes CA-BandwidthClass-r10.

supportedMIMO-CapabilityDL-r10 indicates the number of layers supported for spatial multiplexing in the downlink. When spatial multiplexing is not supported in the downlink, CA-MIMO-ParametersDL-r10 does not include supportedMIMO-CapabilityUL-r10.

CA-BandwidthClass-r10 indicates the CA bandwidth class supported by the terminal device 1 in the uplink or the downlink. CA-BandwidthClassUL-r10 corresponds to the CA bandwidth class supported by the terminal device 1 in the uplink. CA-BandwidthClassDL-r10 corresponds to the CA bandwidth class supported by the terminal device 1 in the downlink. Each of the CA bandwidth classes is defined by the number of cells that can be simultaneously configured by the terminal device 1 in the band indicated by FreqBandIndicator, the total of the bandwidths of the cells simultaneously configured in the band indicated by FreqBandIndicator, and the like. For example, a CA bandwidth class a indicates that a single cell of 20 MHz or lower is configurable.

FIG. 6 is a diagram illustrating an example of RF-Parameters-r10 according to the present embodiment. For example, RF-Parameters-r10 includes one SupportedBandCombination-r10. As described above, SupportedBandCombination-r10 includes one or a plurality of BandCombinationParameters-r10. BandCombinationParameters-r10 includes one or plurality of BandParameters-r10.

BandCombinationParameters-r10 of BCP100 indicates that uplink transmission is possible in a single cell in Band A and that downlink transmission is possible in a single cell in Band A. In other words, BandCombinationParameters-r10 of BCP100 indicates that a single cell is supported in Band A. BandCombinationParameters-r10 of BCP100 indicates that two layers are supported for spatial multiplexing in the downlink in Band A. BandCombinationParameters-r10 of BCP100 indicates that spatial multiplexing is not supported in the uplink in Band A.

BandCombinationParameters-r10 of BCP300 indicates that uplink transmission is possible in a single cell in Band A, that downlink transmission is possible in a single cell in Band A, and that downlink transmission is possible in a single cell in Band B. In other words, BandCombinationParameters-r10 of BCP100 indicates that a combination of a single primary cell in Band A and a single secondary cell in Band B without an uplink is supported. BandCombinationParameters-r10 of BCP300 indicates that the spatial multiplexing in the downlink in Band A, the spatial multiplexing in the downlink in Band B, and the spatial multiplexing in the uplink in Band A are not supported.

A method of configuring a D2D resource according to the present embodiment will be described.

A resource reserved for D2D is referred to as a D2D resource. In an FDD cell, a downlink signal to be used for cellular communication is mapped to subframes of the downlink carrier, an uplink signal to be used for cellular communication is mapped to subframes of the uplink carrier, and a D2D signal to be used for D2D is mapped to subframes of the uplink carrier. A carrier corresponding to a cell in the downlink is referred to as a downlink component carrier. A carrier corresponding to a cell in the uplink is referred to as an uplink component carrier. A TDD carrier is a downlink component carrier and is also an uplink component carrier.

In a TDD cell, a downlink signal to be used for cellular communication is mapped to downlink subframes and DwPTS, an uplink signal to be used for cellular communication is mapped to uplink subframes and UpPTS, and a D2D signal to be used for D2D is mapped to uplink subframes.

Each of an FDD subframe including a D2D resource and a TDD uplink subframe including a D2D resource is also referred to as a sidelink subframe.

The base station device 3 controls D2D resources reserved for D2D. The base station device 3 reserves some of the resources of the uplink carrier in the FDD cell, as D2D resources. The base station device 3 may reserve some of the resources in the uplink subframes and UpPTS in the TDD cell, as D2D resources.

The base station device 3 may transmit a higher layer signal including information indicating a set (pool) of D2D resources reserved in each of the cells, to the terminal device 1. The terminal device 1 sets a parameter D2D-ResourceConfig indicating the D2D resources reserved in each of the cells, in accordance with the higher layer signal received from the base station device 3. In other words, the base station device 3 may set the parameter D2D-ResourceConfig indicating the D2D resources reserved in each of the cells, for the terminal device 1 via the higher layer signal.

The base station device 3 may set one or a plurality of parameters indicating one or a plurality of sets of resources reserved for D2D, for the terminal device 1 via the higher layer signal.

Sets of D2D resources for D2D discovery type 1, D2D discovery type 2, D2D communication mode 1, and D2D communication mode 2 may be configured individually.

Resource sets for D2D physical channels may be configured individually.

Resource sets for D2D transmission and reception may be configured individually.

A resource set for PSSCH relating to D2D data transmission and a resource set for the PSCCH relating to SCI transmission may be configured individually.

From the viewpoint of the terminal device 1, some of the above-described resource sets may be transparent. For example, the PSSCH in D2D communication mode 1 is scheduled in accordance with the SCI, which eliminates the need for the terminal device 1 to configure any resource set for receiving/monitoring the PSSCH in D2D communication mode 1.

3GPP has been considering the use of D2D for public safety (PS). The base station device 3 may notify the terminal device 1 of whether each set of D2D resources is a set of resources for PS. The terminal device 1 may be authorized, via EUTRAN, to perform D2D for PS. In other words, the terminal device 1 that is not authorized to perform D2D for PS is not allowed to perform D2D with a set of resources for PS.

The terminal device 1 may have a configuration relating to D2D configured in advance. When the terminal device 1 fails to detect any cell at the carrier/frequency for which D2D is authorized, the terminal device 1 may perform D2D communication/D2D discovery in accordance with the configuration configured in advance. In other words, when the terminal device 1 is out-of-coverage of EUTRAN at the carrier/frequency for which D2D is authorized, the terminal device 1 may perform D2D communication/D2D discovery at the carrier/frequency for which D2D is authorized, in accordance with the configuration configured in advance. To be more specific, the terminal device 1 may perform D2D transmission and/or reception at the frequency/carrier for which no serving cell has been configured and for which no cell has been detected.

When the terminal device 1 is out-of-coverage of EUTRAN at the carrier/frequency for which D2D is authorized, the terminal device 1 may simultaneously perform D2D communication/D2D discovery at the carrier/frequency for which D2D is authorized, in accordance with the configuration configured in advance, and cellular communication at a carrier/frequency for which D2D is not authorized.

The function of the radio transmission/reception unit 10 of the terminal device 1 may be shared between the cellular link and the sidelink. For example, the function of the radio transmission/reception unit 10 for the cellular link may be partially used for the sidelink. For example, when D2D is not being performed, the function of the radio transmission/reception unit 10 for the sidelink may be used for the cellular link.

A first embodiment will be described below. The first embodiment may be applied to any one or both of D2D communication or D2D discovery. The first embodiment may be applied only to sidelink transmission and cellular link transmission. The first embodiment may be applied only to sidelink reception and cellular link reception.

Possible combinations of one or a plurality of bands in the cellular link and a band in the sidelink vary in a manner that depends on the configuration of the radio transmission/reception unit 10 of the terminal device 1. For example, when two cells in Band A are simultaneously configured in the cellular link, a certain terminal device 1 is able to perform D2D in Band B, but when two cells in Band A and one cell in Band B are simultaneously configured in the cellular link, the terminal device 1 may be unable to perform D2D in Band B. In other words, when no cell is configured in Band B for the cellular link, a certain terminal device 1 is able to perform D2D in Band B, but when at least one cell is configured in Band B for the cellular link, the terminal device 1 may be unable to perform D2D in Band B.

To address this, in the first embodiment, information/parameter ProSeAssistance-r12 indicating the D2D configuration and/or interest of the terminal device 1 and information/parameter RF-Parameters-r12 indicating D2D capability in corresponding BandCobinationParameter-r10 are transmitted together with information/parameter RF-parameters-r10.

Information/parameter ProSeAssistance-r12 may include some or all of information (1) to information (8) described below. Information for D2D communication and information for D2D discovery may be separated from each other. In other words, information for D2D communication and information for D2D discovery may be distinguished from each other. To be more specific, information (1) to information (8) described below may be defined for D2D communication. Furthermore, information (1) to information (8) described below may be defined for D2D discovery. Some of information (1) to information (8) may be brought together to define a single piece of information.

Information (1): information for requesting a resource for D2D transmission

Figure 7:
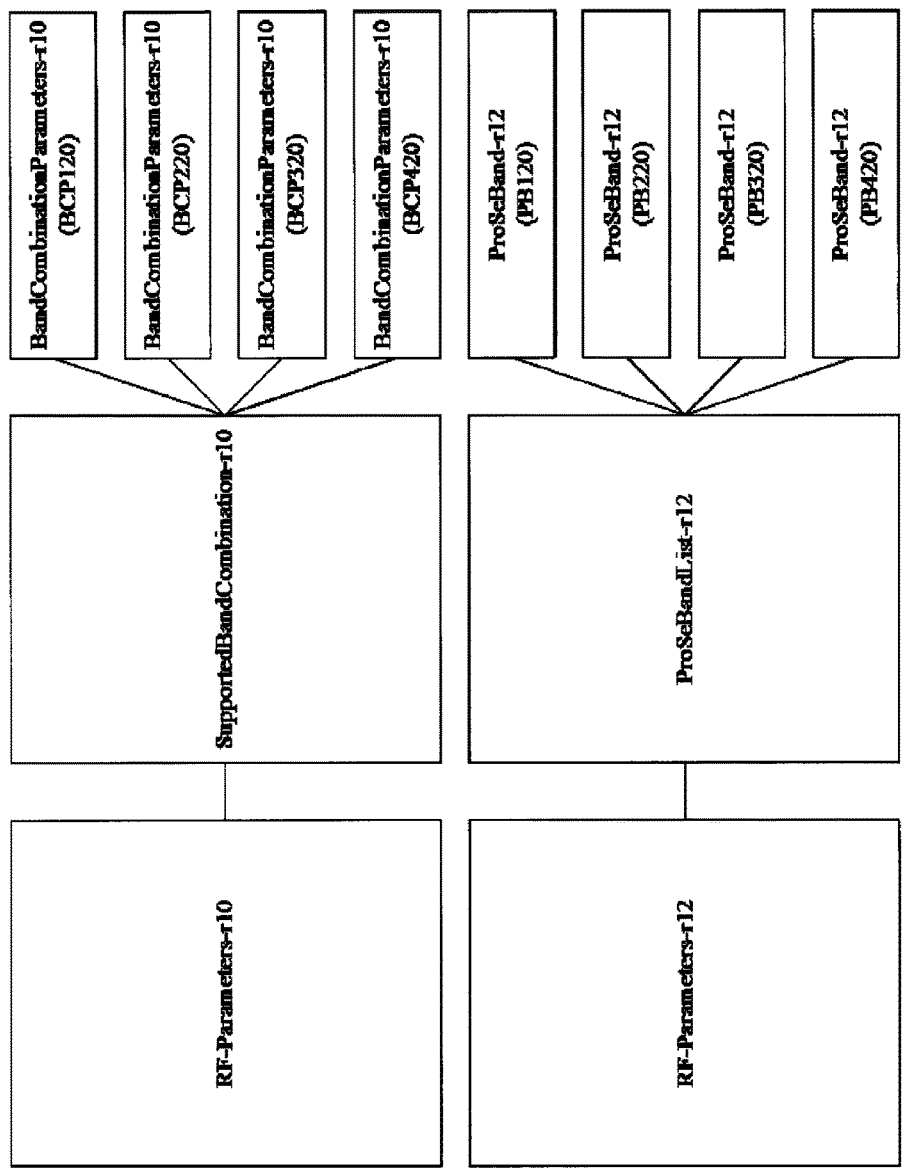
FIG. 7 is a diagram illustrating examples of RF-parameters-r10 and RF-Parameters-r12 according to a first embodiment.

Information (2): information indicating a band/frequency in which a resource for D2D transmission is configured Information (3): information indicating whether there is an interest in D2D transmission Information (4): information indicating a band/frequency in which there is an interest in D2D transmission Information (5): information for requesting a resource for D2D reception/monitoring Information (6): information indicating a band/frequency in which a resource for D2D reception/monitoring is configured Information (7): information indicating whether there is an interest in D2D reception/monitoring Information (8): information indicating a band/frequency in which there is an interest in D2D reception/monitoring FIG. 7 is a diagram illustrating examples of RF-parameters-r10 and RF-Parameters-r12 according to the first embodiment. In FIG. 7, RF-parameters-r10 includes SupportedBandCombination-r10, and SupportedBandCombination-r10 includes four BandCobinationParameter-r10 (BCP120, BCP220, BCP320, and BCP420). RF-parameters-r12 includes ProSeBandList-r12, and ProSeBandList-r12 includes ProSeBand-r12 (PB120, PB220, PB320, and PB420). Here, the number of ProSeBand-r12 included in ProSeBandList-r12 is the same as the number of BandCobinationParameter-r10 (four) included in SupportedBandCombination-r10. In other words, one ProSeBand-r12 corresponds to one BandCobinationParameter-r10. For example, the order of ProSeBand-r12 is the same as the order of the corresponding BandCobinationParameter-r10. In other words, PBX20 corresponds to BCPX20 (X=1, 2, 3, or 4).

Information/parameter ProSeBand-r12 may include some or all of information (9) to information (14) described below. Information for D2D communication and information for D2D discovery may be separated from each other. In other words, information for D2D communication and information for D2D discovery may be distinguished from each other. To be more specific, information (9) to information (14) described below may be defined for D2D communication. Information (9) to information (14) described below may be defined for D2D discovery. Some of information (9) to information (14) may be brought together to define a single piece of information.

Figure 8:
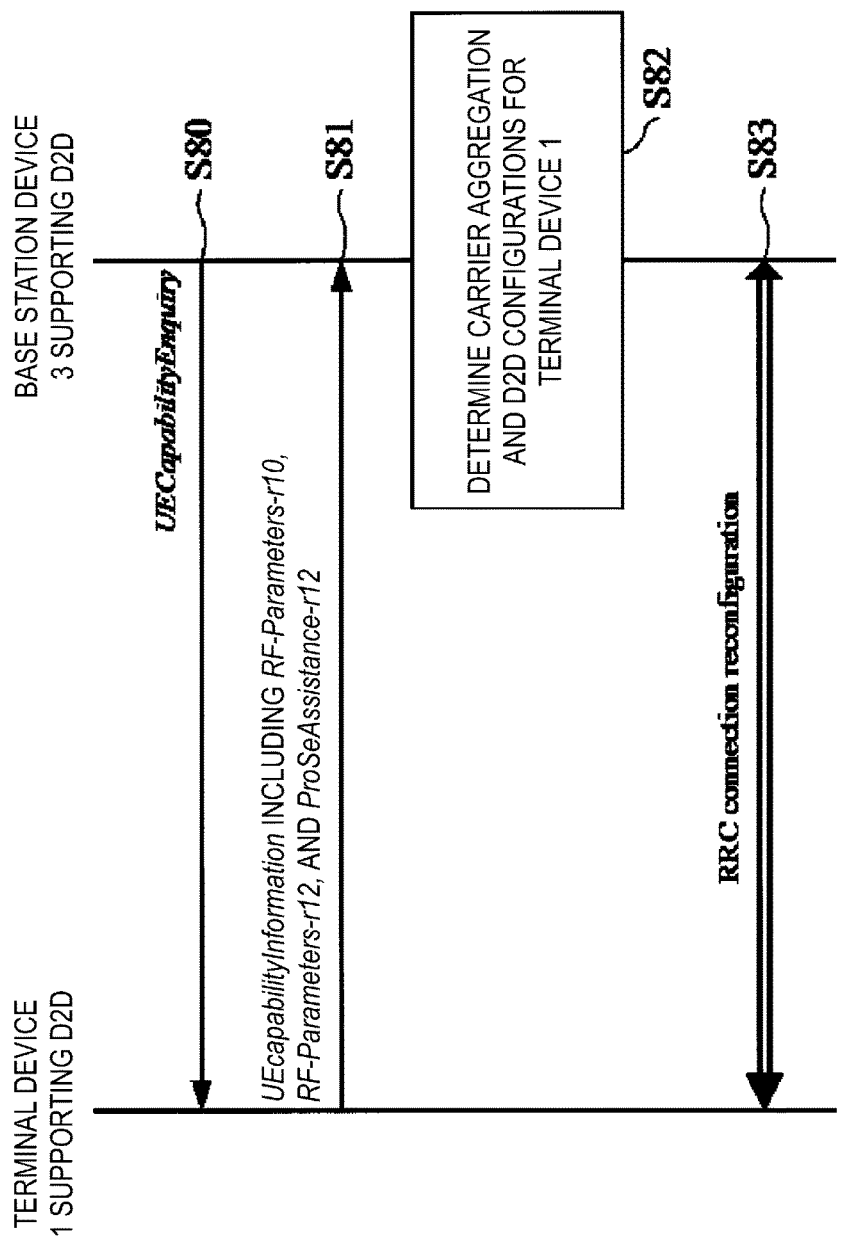
FIG. 8 is a sequence chart relating to transmission of UEcapabilityInformation according to the first embodiment.

Information (9): information indicating that D2D is possible when a band/the number of layers or a combination of bands/the number of layers indicated by a corresponding BandCobinationParameter-r10 is configured for the cellular link Information (10): information indicating that D2D transmission is possible when a band/the number of layers or a combination of bands/the number of layers indicated by a corresponding BandCobinationParameter-r10 is configured for the cellular link Information (11): information indicating that D2D reception is possible when a band/the number of layers or a combination of bands/the number of layers indicated by a corresponding BandCobinationParameter-r10 is configured for the cellular link Information (12): information indicating a band/frequency in which D2D is possible when a band/the number of layers or a combination of bands/the number of layers indicated by a corresponding BandCobinationParameter-r10 is configured for the cellular link Information (13): information indicating a band/frequency in which D2D transmission is possible when a band/the number of layers or a combination of bands/the number of layers indicated by a corresponding BandCobinationParameter-r10 is configured for the cellular link Information (14): information indicating a band/frequency in which D2D reception is possible when a band/the number of layers or a combination of bands/the number of layers indicated by a corresponding BandCobinationParameter-r10 is configured for the cellular link FIG. 8 is a sequence chart relating to the transmission of UEcapabilityInformation according to the first embodiment. UEcpabilityInformation may be an RRC message.

The base station device 3 supporting D2D transmits information/parameter UECapabilityEnquitry for requesting transmission of information/parameter UEcapabilityInformation, to the terminal device 1 supporting either or both of D2D communication and D2D discovery (S80). A base station device supporting D2D is referred to simply as the base station device 3 below. The terminal device 1 supporting either or both of D2D communication and D2D discovery is simply referred to as the terminal device 1 below.

The terminal device 1 that has received information/parameter UECapabilityEnquitry transmits UEcapabilityInformation including ProSeAssistance-r12, RF-Parameters-r10, and RF-parameters-r12, to the base station device 3 (S81). In accordance with the received UEcapabilityInformation, the base station device 3 determines the configuration for carrier aggregation and/or spatial multiplexing, and D2D communication and/or D2D discovery for the terminal device 1 (S82). In accordance with the configuration determined in S82, the base station device 3 performs RRC connection reconfiguration for the terminal device 1 (S83).

These processes allow the base station device 3 to efficiently configure D2D and cells in the cellular link, on the basis of whether the terminal device 1 has an interest in D2D and the capability of the radio transmission/reception unit 10 of the terminal device 1. Moreover, these processes allow the terminal device 1 to simultaneously perform D2D communication, D2D discovery and/or cellular communication in an efficient manner.

A second embodiment will be described below. The second embodiment may be applied to any one or both of D2D communication and D2D discovery. The second embodiment may be applied only to sidelink transmission and cellular link transmission. The second embodiment may be applied only to sidelink reception and cellular link reception.

When the band combination/band indicated by BandCobinationParameter-r10 is configured in a cellular link, the terminal device 1 according to the second embodiment includes BandCobinationParameter-r10 in SupportedBandCombination-r10 or SupportedBandCombinationExt-r12 on the basis of whether sidelink transmission/reception is possible.

In other words, when sidelink transmission/reception is configured, the terminal device 1 according to the second embodiment includes BandCobinationParameter-r10 in SupportedBandCombination-r10 or SupportedBandCombinationExt-r12, on the basis of whether configuration of the combination of bands/the band/the number of layers indicated by BandCobinationParameter-r10 is possible in the cellular link.

When the combination of bands/the band/the number of layers indicated by BandCobinationParameter-r10 is configured in the cellular link, the terminal device 1 according to the second embodiment may include BandCobinationParameter-r10 in SupportedBandCombination-r10 or SupportedBandCombinationExt-r12, on the basis of whether sidelink transmission/reception is possible in a band other than the band indicated by BandCobinationParameter-r10.

In other words, when sidelink transmission/reception is configured in a band other than the band indicated by BandCobinationParameter-r10, the terminal device 1 according to the second embodiment may include BandCobinationParameter-r10 in SupportedBandCombination-r10 or SupportedBandCombinationExt-r12, on the basis of whether configuration of the combination of bands/the band/the number of layers indicated by BandCobinationParameter-r10 is possible in the cellular link.

Note that the combination of bands/the band/the number of layers indicated by BandCobinationParameter-r10 included in SupportedBandCombination-r10 does not coincide with the combination of bands/the band/the number of layers indicated by BandCobinationParameter-r10 included in SupportedBandCombinationExt-r12.

Figure 9:
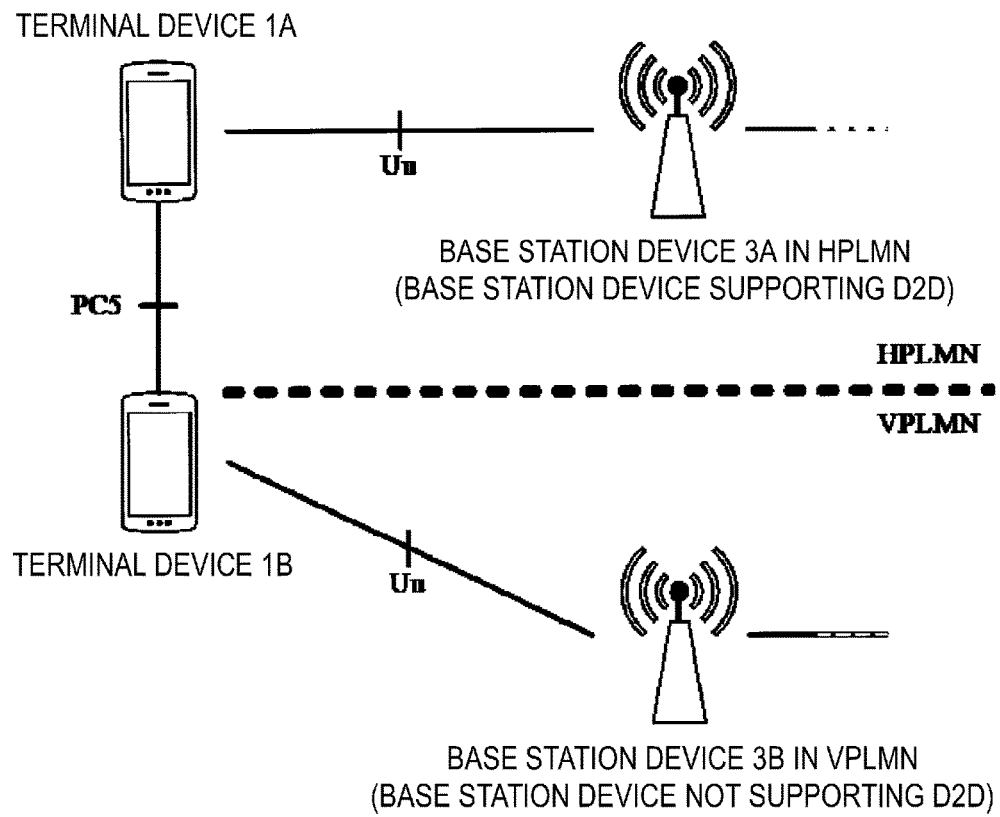
FIG. 9 is a diagram illustrating a state in which a terminal device 1A linked to HPLMN and a terminal device 1B linked to VPLMN perform D2D according to a second embodiment.

FIG. 9 is a diagram illustrating a state in which a terminal device 1A linked to a home public land mobile network (HPLMN) and a terminal device 1B linked to a visited public land mobile network (VPLMN) perform D2D according to the second embodiment. In FIG. 9, the HPLMN supports D2D, while the VPLMN does not support D2D. In FIG. 9, the terminal device 1A and the terminal device 1B perform D2D at a carrier/frequency authorized in the HPLMN.

In FIG. 9, the terminal device 1B roaming in the VPLMN performs D2D at the carrier/frequency authorized in the HPLMN. This means that, in FIG. 9, any CA band combination not supporting D2D is not configurable among the combinations of CA bands transmitted by the terminal device 1B using RF-parameters-r10. However, the VPLMN does not support D2D, which causes neither ProSeAssistance-r12 nor RF-parameters-r12 to be identified. Hence, there is a problem that an attempt is made to configure a CA band combination not supporting D2D, in accordance with RF-parameters-r10.

To address this, in the second embodiment, SupportedBandCombination-r10 may include a combination of CA bands/the number of layers supported simultaneously with D2D and a non-CA band/the number of layers supported simultaneously with D2D. In other words, SupportedBandCombination-r10 may include the combination of CA bands/the number of layers supported even when D2D is being performed and the non-CA band/the number of layers supported even when D2D is being performed. To be more specific, SupportedBandCombination-r10 does not include a combination of CA bands/the number of layers not supported simultaneously with D2D and a non-CA band/the number of layers not supported simultaneously with D2D.

In the second embodiment, RF-Parameters-r12 additionally includes information/parameter SupportedBandCombinationExt-r12. SupportedBandCombinationExt-r12 may include the combination of CA bands/the number of layers supported only when D2D is not being performed. SupportedBandCombinationExt-r12 may include the non-CA band/the number of layers supported only when D2D is not being performed.

Figure 10:
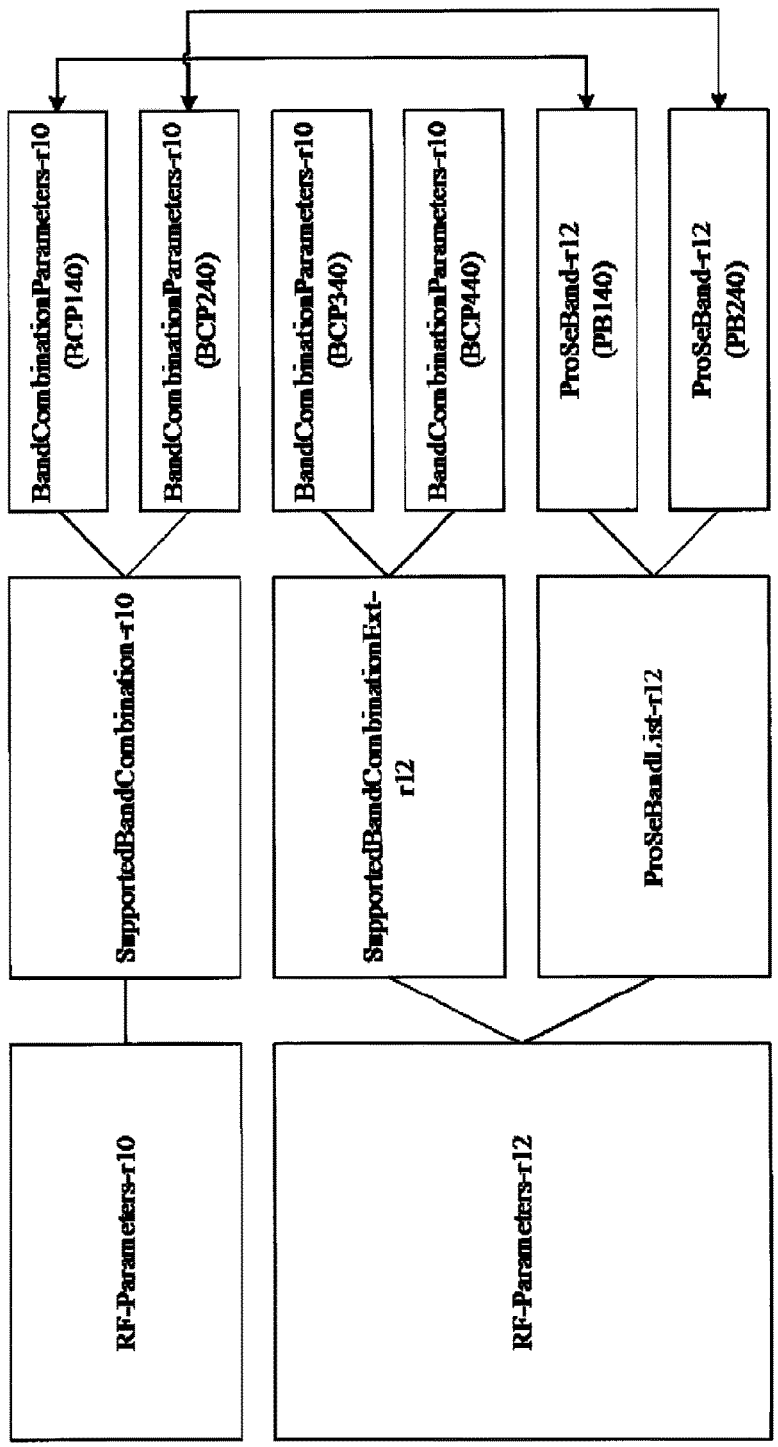
FIG. 10 is a diagram illustrating examples of RF-parameters-r10 and RF-Parameters-r12 according to the second embodiment.

FIG. 10 is a diagram illustrating examples of RF-parameters-r10 and RF-Parameters-r12 according to the second embodiment. In FIG. 10, RF-parameters-r10 includes SupportedBandCombination-r10, and SupportedBandCombination-r10 includes two BandCobinationParameter-r10 (BCP140 and BCP240). Here, each of BandCobinationParameter-r10 (BCP140 and BCP240) indicates the combination of CA bands/the number of layers supported even when D2D is being performed or the non-CA band/the number of layers supported even when D2D is being performed. In other words, each of BandCobinationParameter-r10 (BCP140 and BCP240) may indicate the combination of CA bands/the non-CA band/the number of layers supported for the cellular link (each downlink and/or uplink) simultaneously with a D2D operation. To be more specific, each of BandCobinationParameter-r10 (BCP140 and BCP240) may indicate the combination of CA bands/the non-CA band/the number of layers supported when D2D transmission/reception is configured.

In FIG. 10, RF-Parameters-r12 includes SupportedBandCombinationExt-r12 and ProSeBandList-r12. In FIG. 10, SupportedBandCombinationExt-r12 includes two BandCobinationParameter-r10 (PB340 and PB440). Here, each of BandCobinationParameter-r10 (PB340 and PB440) indicates a CA band combination supported only when D2D is not being performed or a non-CA band supported only when D2D is not being performed. In other words, each of BandCobinationParameter-10 (PB340 and PB440) may indicate the combination of CA bands/the non-CA band/the number of layers not supported for the cellular link (each downlink and/or uplink) simultaneously with a D2D operation. To be more specific, each of BandCobinationParameter-r10 (PB40 and PB440) may indicate the combination of CA bands/the non-CA band/the number of layers supported when D2D transmission/reception is not configured.

In FIG. 10, ProSeBandList-r12 includes two ProSeBand-r12 (PB140 and PB240), the number of which is the same as the number of BandCobinationParameter-r10 included in SupportedBandCombination-r10. One ProSeBand-r12 corresponds to one BandCobinationParameter-r10. The order of ProSeBand-r12 is the same as the order of corresponding BandCobinationParameter-r10. In other words, PBX40 corresponds to BCPX40 (X=1 or 2). As described above, ProSeBand-r12 may include some or all of information (9) to information (14).

The base station device 3 can determine that BandCobinationParameter-r10 included in SupportedBandCombinationExt-r12 implicitly indicates the combination of CA bands/the number of layers supported only when D2D is not being performed or the non-CA band/the number of layers supported only when D2D is not being performed, which eliminates the need for ProSeBand-r12 corresponding to BandCobinationParameter-r10 included in SupportedBandCombinationExt-r12 to be included in ProSeBandList-r12. This makes it possible to reduce the information volume of UEcapabilityInformation.

Figure 11:
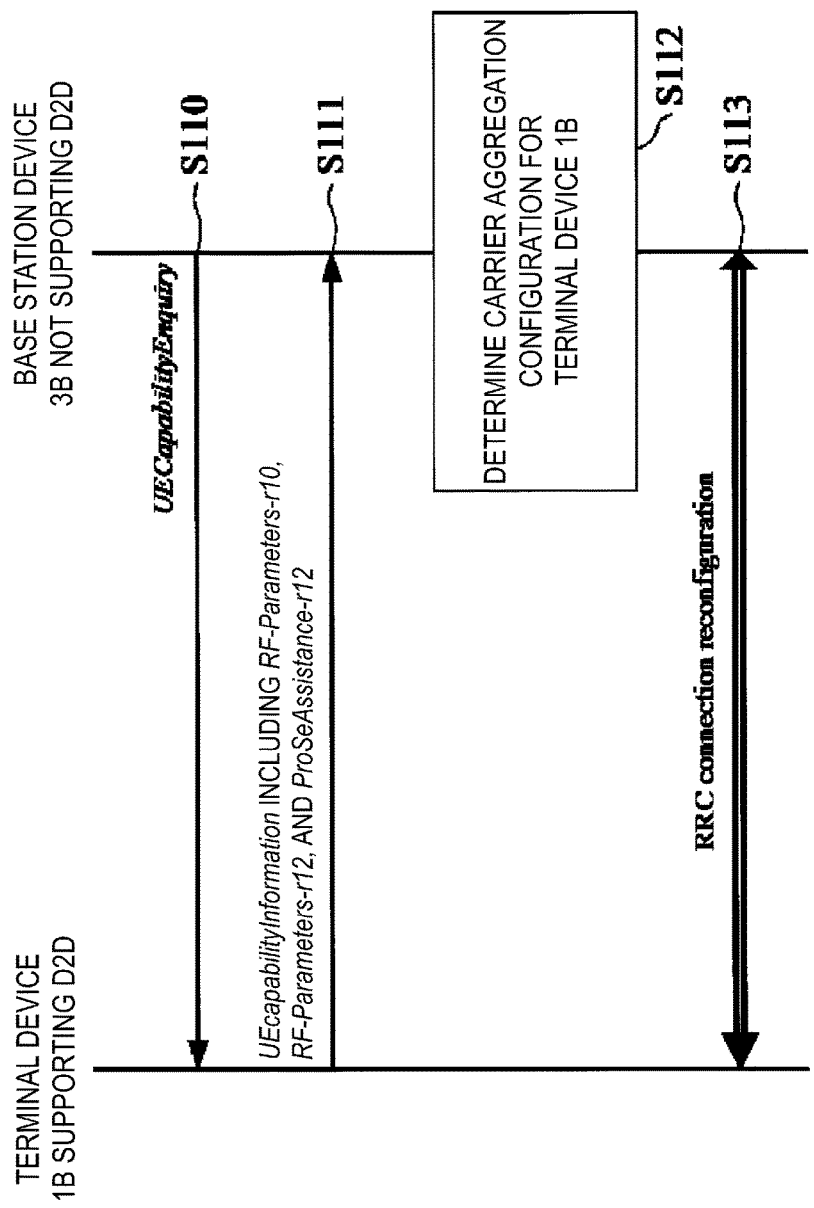
FIG. 11 is a sequence chart relating to transmission of UEcapabilityInformation according to the second embodiment.

FIG. 11 is a sequence chart relating to transmission of UEcapabilityInformation according to the second embodiment.

A base station device 3B not supporting D2D transmits information/parameter UECapabilityEnquitry for requesting transmission of information/parameter UEcpabilityInformation, to the terminal device 1B supporting either or both of D2D communication and D2D discovery (S110).

The terminal device 1 that has received information/parameter UECapabilityEnquitry transmits UEcapabilityInformation including ProSeAssistance-r12, RF-Parameters-r10, and RF-parameters-r12, to the base station device 3 (S111). In accordance with RF-Parameters-r10 included in the received UEcapabilityInformation, the base station device 3 determines the configuration for carrier aggregation and/or spatial multiplexing for the terminal device 1 (S112). In accordance with the configuration determined in S112, the base station device 3 performs RRC connection reconfiguration for the terminal device 1 (S113).

The base station device 3B not supporting D2D ignores (unable to identify) SupportedBandCombinationExt-r12. Thus, the combination of CA bands/the number of layers supported only when D2D is not being performed and the non-CA band/the number of layers supported only when D2D is not being performed are not configured for the terminal device 1B supporting D2D. This causes the base station device 3B not supporting D2D to configure, in accordance with SupportedBandCombination-r10, the combination of CA bands/the number of layers supported even when D2D is being performed and the non-CA band/the number of layers supported even when D2D is being performed, for the terminal device 1B supporting D2D.

In accordance with SupportedBandCombinationExt-r12 (and/or ProSeBandList-r12), the base station device 3B supporting D2D may configure the combination of CA bands/the number of layers supported only when D2D is not being performed and the non-CA band/the number of layers supported only when D2D is not being performed, for the terminal device 1B supporting D2D and not performing D2D. In accordance with SupportedBandCombination-r10, the base station device 3B supporting D2D may configure the combination of CA bands/the number of layers supported even when D2D is being performed and the non-CA band/the number of layers supported even when D2D is being performed, for the terminal device 1B supporting D2D and performing D2D.

These processes allow the terminal device 1 to simultaneously perform D2D communication, D2D discovery and/or cellular communication in an efficient manner. Moreover, these processes allow even the base station device 3 not supporting D2D to efficiently communicate with the terminal device 1 supporting D2D.

In the second embodiment, BandCobinationParameter-r10, indicating the combination of CA bands/the non-CA band/the number of layers supported when D2D is being performed in a certain band while not being supported when D2D is being performed in a band different from the certain band, may be included in SupportedBandCombinationExt-r12.

In this case, ProSeBand-r12 corresponding to BandCobinationParameter-r10 included in SupportedBandCombinationExt-r12 is needed. For this reason, in this case, ProSeBandList-r12 preferably includes ProSeBand-r12, the number of which is the same as the total of the number of BandCobinationParameter-r10 included in SupportedBandCombination-r10 and the number of BandCobinationParameter-r10 included in SupportedBandCombinationExt-r12, in ProSeBandList-r12.

Note that, in the first embodiment, BandCobinationParameter-r10 may be configured, SupportedBandCobination-r10 may be configured to indicate the combination of bands/the band/the number of layers supported even when D2D is being performed. In this case, in the first embodiment, when ProseBand-r12 includes information (12), information (13), and/or information (14) and when sidelink transmission/reception is not configured for the terminal device 1, the base station device 3 supporting D2D interprets the situation as the number of cells configurable for the cellular link increases by one in the band indicated by information (12), information (13), and/or information (14).

A third embodiment will be described below. The third embodiment may be applied to any one or both of D2D communication and D2D discovery. The third embodiment may be applied to any one or both of D2D communication mode 1 and D2D communication mode. The third embodiment may be applied to any one or both of D2D discovery type 1 and D2D discovery type 2. The third embodiment may be applied to some or all of the sidelink physical channels. The third embodiment may be applied to any one or both of the sidelink transmission and reception.

In the third embodiment as in the first embodiment and the second embodiment, the terminal device 1 performs D2D transmission and/or reception at the frequency/carrier for which no serving cell has been configured and at which no cell has been detected. The terminal device 1 performs D2D transmission and/or reception at the frequency/carrier for which no serving cell has been configured and at which no cell has been detected, in accordance with a configuration configured in advance.

Furthermore, in the third embodiment, the terminal device 1 performs D2D transmission and/or reception at the frequency/carrier for which no serving cell has been configured and at which a non-serving cell other than a serving cell has successfully been detected. The terminal device 1 performs D2D transmission and/or reception at the frequency/carrier for which no serving cell has been configured and at which a non-serving cell other than a serving cell has successfully been detected, when a resource pool for D2D transmission and/or reception is provided in or broadcast to the non-serving cell.

Note that the first embodiment and the second embodiment may be applied to a case of performing D2D transmission and/or reception at the frequency/carrier for which no serving cell is configured and at which a non-serving cell other than a serving cell has successfully been detected.

The radio transmission/reception unit 10 according to the third embodiment is capable of simultaneously receiving physical channels (1) to (7) described below in the same subframe. In other words, combinations of physical channels (1) to (7) described below indicate possible combinations of physical channels that can be received simultaneously by the terminal device 1 in the same subframe. For example, the terminal device 1 may simultaneously perform downlink reception in a non-serving cell and sidelink reception in the non-serving cell.

The radio transmission/reception unit 10 according to the third embodiment is capable of receiving physical channels (1) to (6) described below and transmitting physical channel (7) described below simultaneously in the same subframe. In other words, the combinations of physical channels (1) to (7) described below indicate possible combinations of physical channels that can be received and transmitted simultaneously by the terminal device 1 in the same subframe. For example, the terminal device 1 may simultaneously perform downlink reception in a non-serving cell and sidelink transmission in the non-serving cell.

The radio transmission/reception unit 10 according to the third embodiment is capable of receiving physical channels (1) to (4) described below and physical channel (8) described below simultaneously in the same subframe. In other words, the combinations of physical channels (1) to (4) described below and physical channel (8) described below indicate possible combinations of physical channels that can be received simultaneously by the terminal device 1 in the same subframe.

Physical channel (1): PBCH in the downlink in a serving cell (primary cell)
Physical channel (2): PDCCH in the downlink in a serving cell (primary cell)
Physical channel (3): PDSCH in the downlink in a serving cell (primary cell)
Physical channel (4): PBCH in the downlink in a non-serving cell
Physical channel (5): PDCCH in the downlink in a non-serving cell
Physical channel (6): PDSCH in a downlink in a non-serving cell
Physical channel (7): PSBCH/PSCCH/PSSCH/PSDCH in a sidelink in a non-serving cell
Physical channel (8): PSBCH/PSCCH/PSSCH/PSDCH in a sidelink in a serving cell (primary cell)

In the third embodiment, transmission and reception of the PSBCH/PSCCH/PSSCH/PSDCH in a sidelink is not performed simultaneously in a plurality of cells. In other words, transmission/reception of physical channel (7) and transmission/reception of physical channel (8) are not performed simultaneously.

The PBCH in the downlink in a serving cell (primary cell) carries a master information block including information indicating the downlink bandwidth of the serving cell. The cell bandwidth is expressed by the number of physical resource blocks.

For example, the PDSCH in the downlink in the serving cell (primary cell) carries a higher layer signal (system information) for the serving cell in the cellular link. Here, the PDSCH in the downlink in the serving cell (primary cell) may carry a higher layer signal (system information, SystemInformationBlock18) including information indicating a set (pool) of D2D resources reserved in the serving cell.

For example, the PDCCH in the downlink in the serving cell (primary cell) carries the first information used for scheduling of the PDSCH in the downlink in the serving cell. CRC parity bits scrambled with a system information radio network temporary identifier (SI-RNTI) are attached to the first information. In other words, for example, the RNTI to be monitored for the PDCCH in the downlink in the serving cell (primary cell) may be the SI-RNTI.

The PBCH in the downlink in a non-serving cell carries a master information block including information indicating the downlink bandwidth of the non-serving cell.

The PDSCH in the downlink in the non-serving cell carries a higher layer signal (system information, SystemInformationBlock18) including information indicating a set (pool) of D2D resources reserved in the non-serving cell.

The PDCCH in the downlink in the non-serving cell carries the second information used for scheduling of the PDSCH in the downlink in the non-serving cell. CRC parity bits scrambled with an SI-RNTI are attached to the second information. In other words, for example, the RNTI to be monitored for the PDCCH in the downlink in the non-serving cell may be the SI-RNTI.

Note that a broadcast channel (BCH) is mapped to the PBCH. Furthermore, a downlink shared channel (DL-SCH) is mapped to the PDSCH. The BCH and the DL-SCH are transport channels. In other words, the transport channel associated with the PBCH is the BCH. Furthermore, the transport channel associated with the PDSCH is the DL-SCH.

The terminal device 1 monitors the PDCCH in the downlink in the serving cell (primary cell), in a common search space in the downlink in the serving cell (primary cell).

The terminal device 1 monitors the PDCCH in the downlink in the non-serving cell, in a common search space in the downlink in the non-serving cell.

Monitoring the PDCCH corresponds to attempting to decode the PDCCH in the set of PDCCH candidates in accordance with all downlink control information formats to be monitored. The PDCCH candidates are candidate resources that may be used for transmission of the PDCCH. The set of PDCCH candidates is referred to as a search space.

The common search space is a search space defined only in accordance with cell-specific parameters. In other words, the common search space is a search space common to the terminal devices. The common search space is a set of PDCCH candidates constituted of control channel elements with predefined indexes. The common search space may be defined for each cell. No common search space needs to be defined for a secondary cell.

Figure 12:
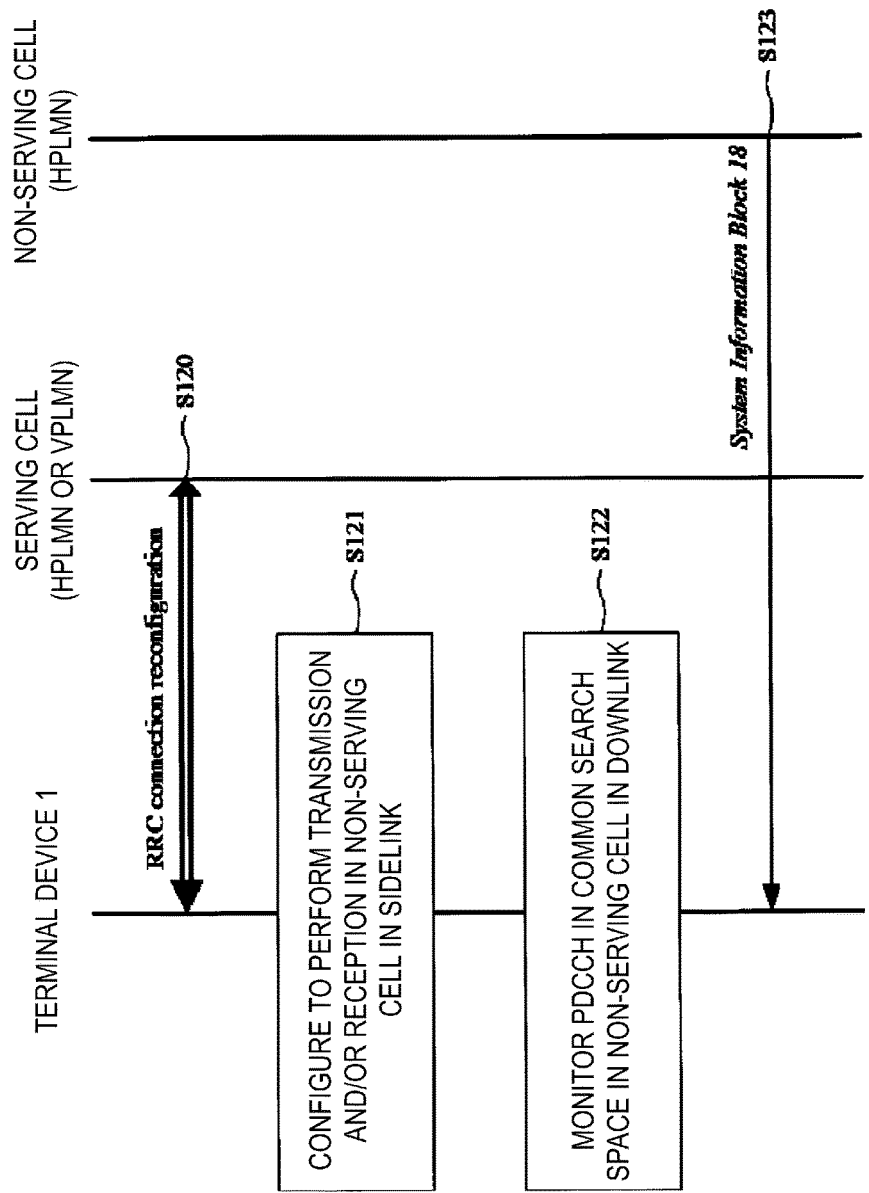
FIG. 12 is a sequence chart illustrating an example according to a third embodiment.

FIG. 12 is a sequence chart illustrating an example according to the third embodiment.

The terminal device 1 linked to HPLMN or VPLMN performs an RRC connection reconfiguration procedure to configure/reconfigure a serving cell in HPLMN or VPLMN (S120).

The terminal device 1 is configured by a higher layer to perform transmission and/or reception (decoding) in the sidelink in a non-serving cell (S121).

When the terminal device 1 is configured by the higher layer to perform transmission and/or reception in the sidelink in the non-serving cell, the terminal device 1 monitors the PDCCH (physical channel (5)) in the common search space in the downlink in the non-serving cell (step S122). When the terminal device 1 is configured by the higher layer to transmit and/or receive the PSCCH/PSSCH/PSBCH/PSDCH in a cell, the terminal device 1 monitors, in the common search space in the cell, the PDCCH necessary for the transmission and/or reception of the PSCCH/PSSCH/PSBCH/PSDCH in the cell. Here, the cell may be a non-serving cell/frequency/carrier. For example, the transmission and/or reception of the PSCCH/PSSCH/PSBCH/PSDCH is performed in the sidelink in the non-serving cell.

Monitoring the PDCCH in the common search space is performed in the downlink in the non-serving cell.

The terminal device 1 receives SystemInformationBlock18 relating to resources in the sidelink via the PDSCH in the downlink in the non-serving cell (step S123).

Figure 13:
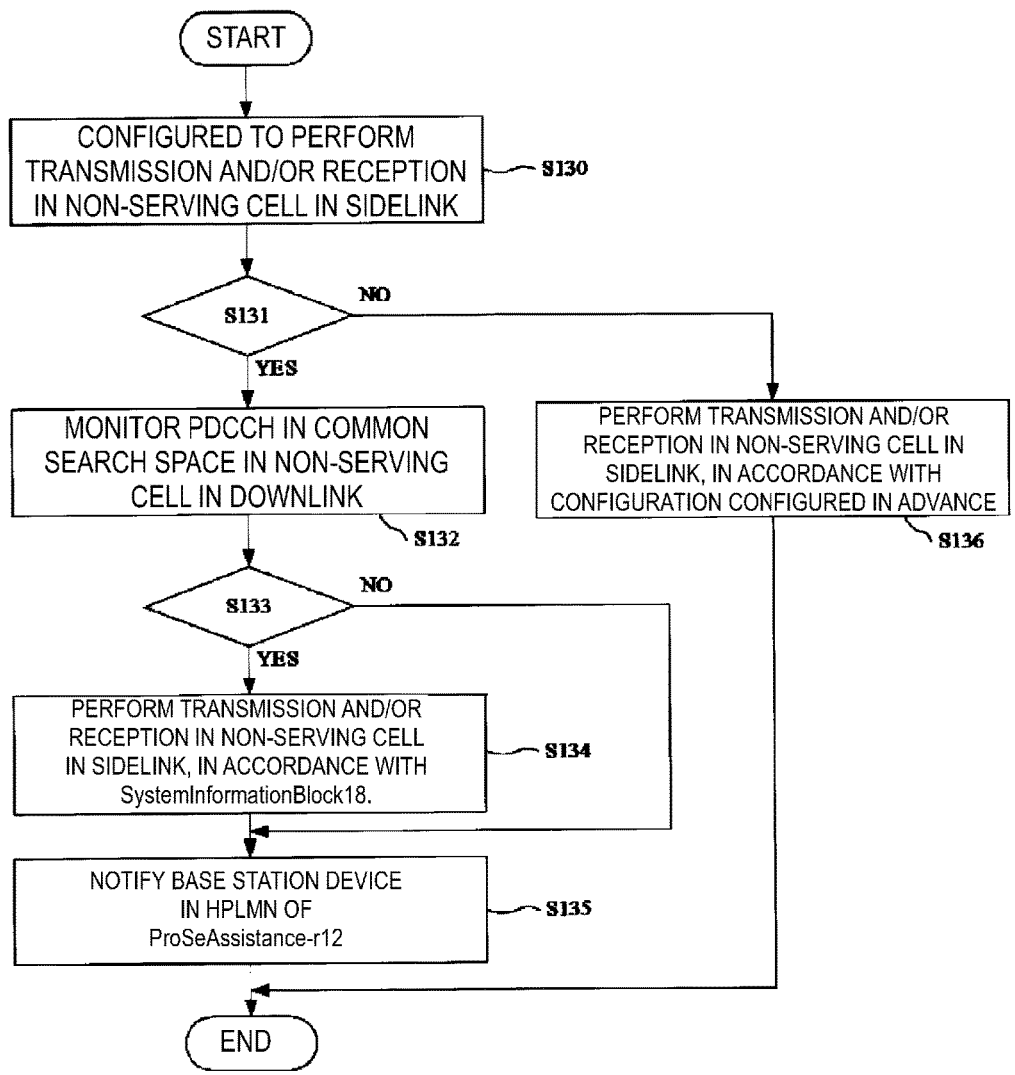
FIG. 13 is a flowchart illustrating an example according to the third embodiment.

FIG. 13 is a flowchart illustrating an example according to the third embodiment.

The terminal device 1 is configured by a higher layer in the terminal device 1 or the like, to perform transmission and/or reception in the sidelink in the non-serving cell (S130). When no serving cell is configured and a non-serving cell has been detected at a carrier/frequency at which D2D is authorized (YES in S131), the PDCCH is monitored/received in the common search space in the downlink in the non-serving cell (S132).

The terminal device 1 configured to perform D2D reception receives the PDSCH corresponding to the PDCCH received in S132. When the system information block received via the PDSCH includes information indicating a resource pool for D2D reception, the terminal device 1 proceeds to S134 (Yes in S133).

The terminal device 1 configured to perform D2D transmission receives the PDSCH corresponding to the PDCCH received in S132. When SystemInformationBlock18 received via the PDSCH includes information indicating a resource pool for D2D transmission, the terminal device 1 proceeds to S134 (Yes in S133).

In S134, the terminal device 1 performs transmission and/or reception in the sidelink in the non-serving cell in accordance with SystemInformationBlock18 (S134) and then proceeds to S135.

The terminal device 1 configured to perform D2D reception receives the PDSCH corresponding to the PDCCH received in S132. When SystemInformationBlock18 received via the PDSCH does not include information indicating a resource pool for D2D reception, the terminal device 1 proceeds to S135 without performing D2D reception (No in S133).

The terminal device 1 configured to perform D2D transmission receives the PDSCH corresponding to the PDCCH received in S132. When the system information block received via the PDSCH does not include information indicating a resource pool for D2D transmission, the terminal device 1 proceeds to S135 without performing D2D transmission (No in S133).

In S135, the terminal device 1 notifies the base station device 3 in the HPLMN of ProSeAssistance-r12 (S135). Here, for the notification of information on D2D, the terminal device 1 in RRC_IDLE state may perform an RRC connection establishment procedure in S135. After S135, the terminal device 1 terminates the process.

When no serving cell has been configured and no non-serving cell has been detected at a carrier/frequency at which D2D is authorized (YES in S131), the terminal device 1 performs transmission and/or reception in the sidelink in the non-serving cell in accordance with the configuration configured in advance (S136). After S136, the terminal device 1 terminates the process.

(1) The terminal device 1 according to the present embodiments is a terminal device 1 that performs transmission and/or reception in a link (sidelink) between terminal devices and includes a transmission unit that transmits UEcapabilityInformation to the base station device 3. UEcapabilityInformation includes SupportedBandCombination-r10 and SupportedBandCombinationExt-r12. SupportedBandCombination-r10 described above indicates a band and/or a combination of bands that is supported only when transmission and/or reception is not being performed in the link between the terminal devices and that is to be used for communication with the base station device, and SupportedBandCombinationExt-r12 indicates a band and/or a combination of bands that is supported even when transmission and/or reception is being performed in the link between the terminal devices and that is to be used for communication with the base station device.

(2) In the present embodiments, SupportedBandCombination-r10 indicates the number of layers supported for spatial multiplexing in each of the bands indicated by SupportedBandCombination-r10, and SupportedBandCombinationExt-r12 indicates the number of layers supported for spatial multiplexing in each of the bands indicated by SupportedBandCombinationExt-r12.

(3) In the present embodiments, SupportedBandCombinationExt-r12 is not identified by the base station device 3 that does not have the capability of controlling transmission and/or reception in the link between the terminal devices.

(4) In the present embodiments, UEcapabilityInformation includes ProSeAssistance-r12, and ProSeAssistance-r12 includes some or all of information (A1) to information (A8) described below.

Information (A1): information for requesting a resource for D2D transmission

Information (A2): information indicating a band/frequency for which a resource for D2D transmission is configured Information (A3): information indicating whether there is an interest in D2D transmission Information (A4): information indicating a band/frequency for which there is an interest in D2D transmission Information (A5): information for requesting a resource for D2D reception/monitoring Information (A6): information indicating a band/frequency for which a resource for D2D reception/monitoring is configured Information (A7): information indicating whether there is an interest in D2D reception/monitoring Information (A8): information indicating a band/frequency in which there is an interest in D2D reception/monitoring (5) In the present embodiments, UEcapabilityInformation includes ProSeBand-r12 corresponding to the band and/or the combination of bands indicated by SupportedBandCombination-r10, and ProSeBandList-r12 includes some or all of information (B1) to information (B6) described below.

Information (B1): information indicating that D2D is possible when the corresponding band or combination of bands is configured for communication with the base station Information (B2): information indicating that D2D transmission is possible when the corresponding band or combination of bands is configured for communication with the base station Information (B3): information indicating that D2D reception is possible when the corresponding band or combination of bands is configured for communication with the base station Information (B4): information indicating a band/frequency in which D2D is possible when the corresponding band or combination of bands is configured for communication with the base station Information (B5): information indicating a band/frequency in which D2D transmission is possible when the corresponding band or combination of bands is configured for communication with the base station Information (B6): information indicating a band/frequency in which D2D reception is possible when the corresponding band or combination of bands is configured for communication with the base station (6) In the present embodiments, UEcapabilityInformation does not include ProSeBand-r12 corresponding to each band and/or combination of bands indicated by SupportedBandCombinationExt-r12.

(7) The base station device 3 according to the present embodiments includes a reception unit receiving UEcapabilityInformation.

(8) The terminal device 1 according to the present embodiments is a terminal device 1 communicating with an Evolved Universal Terrestrial Radio Access Network (EUTRAN) and includes a reception unit simultaneously receiving, in the same subframe, a PBCH, a PDCCH, and a PDSCH in a downlink in a serving cell, a PBCH, a PDCCH, and a PDSCH in the downlink in a non-serving cell other than the serving cell, and a physical channel in a link between terminal devices in the non-serving cell. The reception unit monitors the PDCCH in a common search space in the downlink of the non-serving cell upon being configured to decode the physical channel in the link between the terminal devices in the non-serving cell.

(9) The terminal device 1 according to the present embodiments further includes a transmission unit transmitting the physical channel in the link between the terminal devices in the non-serving cell. The reception unit monitors the PDCCH in the common search space in the downlink of the non-serving cell upon being configured to transmit the physical channel in the link between the terminal devices in the non-serving cell.

(10) In the present embodiments, the PDCCH in the downlink in the serving cell is used for carrying first information to which CRC parity bits scrambled with an SI-RNTI are attached, and the PDCCH in the downlink in the non-serving cell is used for carrying second information to which CRC parity bits scrambled with the SI-RNTI are attached.

(11) In the present embodiments, the first information is used for scheduling of the PDSCH in the downlink in the serving cell, and the second information is used for scheduling of the PDSCH in the downlink in the non-serving cell.

(12) In the present embodiments, the PDCCH in the common search space in the downlink of the non-serving cell carries information to be used for scheduling of the PDSCH in the downlink in the non-serving cell, and the PDSCH in the downlink in the non-serving cell carries a system information block.

A program running on each of the base station device 3 and the terminal device 1 according to the present invention may be a program that controls a central processing unit (CPU) and the like (a program for causing a computer to operate) in such a manner as to realize the functions according to the above-described embodiments of the present invention. The information handled in these devices is temporarily stored in a random access memory (RAM) while being processed. Thereafter, the information is stored in various types of read only memory (ROM) such as a flash ROM and a hard disk drive (HDD) and when necessary, is read by the CPU to be modified or rewritten.

Moreover, the terminal device 1 and the base station device 3 according to the above-described embodiments may be partially realized by the computer. This configuration may be realized by recording a program for realizing such control functions on a computer-readable medium and causing a computer system to read the program recorded on the recording medium for execution.

Moreover, the "computer system" here is defined as a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, the base station device 3 according to the above-described embodiments can be realized as an aggregation (a device group) constituted of a plurality of devices. Devices constituting the device group may be each equipped with some or all portions of each function or each functional block of the base station device 3 according to the above-described embodiments. It is only required that the device group itself include general functions or general functional blocks of the base station device 3. Furthermore, the terminal device 1 according to the above-described embodiments can also communicate with the base station device as the aggregation.

Furthermore, the base station device 3 according to the above-described embodiments may be an Evolved Universal Terrestrial Radio Access Network (EUTRAN). Furthermore, the base station device 3 according to the above-described embodiments may have some or all portions of a function of a node higher than an eNodeB.

Furthermore, some or all portions of each of the terminal device 1 and the base station device 3 according to the above-described embodiments may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, a circuit integration technique is not limited to the LSI, and the integrated circuit may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiments, the terminal device is described as one example of a communication device, but the present invention is not limited to this, and can be applied to a fixed-type electronic apparatus installed indoors or outdoors, or a stationary-type electronic apparatus, for example, a terminal device or a communication device, such as an audio-video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

INDUSTRIAL APPLICABILITY

The present invention can be applied to mobile phones, personal computers, tablet-type computers, and the like.

REFERENCE SIGNS LIST 1 (1A, 1B, 1C) Terminal device
3 (3A, 3B) Base station device
10 Radio transmission/reception unit
11 Antenna unit
12 RF unit
13 Baseband unit
14 Higher layer processing unit
15 D2D control unit
16 Radio resource control unit
30 Radio transmission/reception unit
31 Antenna unit
32 RF unit
33 Baseband unit
34 Higher layer processing unit
35 D2D control unit
36 Radio resource control unit

The invention claimed is:

1. A terminal device communicating with an Evolved Universal Terrestrial Radio Access Network (EUTRAN), the terminal device comprising
reception circuitry configured to and/or programmed to receive:
a Physical Downlink Control Channel (PDCCH) and a Physical Downlink Shared Channel (PDSCH) in a downlink in a serving cell,
a PDSCH in the downlink in a non-serving cell other than the serving cell, and
a physical channel in a link between terminal devices in the non-serving cell, and
decoding circuitry configured to and/or programmed to decode the PDSCH in the downlink of the non-serving cell prior to transmission and reception in the link between the terminal devices in the non-serving cell, in case that the terminal device is configured to perform the transmission and the reception,
wherein the PDSCH in the downlink of the non-serving cell carries a system information block 18 indicating a pool of Device to Device (D2D) resources reserved in the non-serving cell, and a part of the D2D resources is used for the transmission in the link in the non-serving cell.

2. The terminal device according to claim 1, wherein
a PDCCH in the downlink in the serving cell is used for carrying first information to which Cyclic Redundancy Check (CRC) parity bits scrambled with a System information-Radio Network Temporary Identifier (SI-RNTI) are attached, and
a PDCCH in the downlink in the non-serving cell is used for carrying second information to which CRC parity bits scrambled with the SI-RNTI are attached.

3. The terminal device according to claim 2, wherein
the first information is used for scheduling of the PDSCH in the downlink in the serving cell, and
the second information is used for scheduling of the PDSCH in the downlink in the non-serving cell.

4. The terminal device according to claim 1, wherein
the reception circuitry receives a PDCCH in a common search space in the downlink of the non-serving cell, which PDCCH carries information to be used for scheduling of the PDSCH in the downlink in the non-serving cell, and
the PDSCH in the downlink in the non-serving cell carries a system information block in the non-serving cell.

5. A communication method used by a terminal device communicating with an Evolved Universal Terrestrial Radio Access Network (EUTRAN), the communication method comprising the steps of
receiving a Physical Downlink Control Channel (PDCCH), and a Physical Downlink Shared Channel (PDSCH) in a downlink in a serving cell,
a PDSCH in the downlink in a non-serving cell other than the serving cell, and a physical channel in a link between terminal devices in the non-serving cell, and
decoding the PDSCH in the downlink of the non-serving cell prior to transmission and reception in the link between the terminal devices in the non-serving cell, in a case that the terminal device is configured to perform the transmission and the reception,
wherein the PDSCH in the downlink of the non-serving cell carries a system information block 18 indicating a pool of Device to Device (D2D) resources reserved in the non-serving cell, and a part of the D2D resources is used for the reception in the link in the non-serving cell.

6. The communication method according to claim 5, wherein
a PDCCH in the downlink in the serving cell is used for carrying first information to which Cyclic Redundancy Check (CRC) parity bits scrambled with a System Information-Radio Network Temporary Identifier (SI-RNTI) are attached, and
a PDCCH in the downlink in the non-serving cell is used for carrying second information to which CRC parity bits scrambled with the SI-RNTI are attached.

7. The communication method according to claim 6, wherein
the first information is used for scheduling of the PDSCH in the downlink in the serving cell, and
the second information is used for scheduling of the PDSCH in the downlink in the non-serving cell.

8. The communication method according to claim 5 comprising the step of
receiving a PDCCH in a common search space in the downlink of the non-serving cell, which PDCCH carries information to be used for scheduling of the PDSCH in the downlink in the non-serving cell, wherein
the PDSCH in the downlink in the non-serving cell carries a system information block.

9. An integrated circuit mounted on a terminal device communicating with an Evolved Universal Terrestrial Radio Access Network (EUTRAN), the integrated circuit comprising a set of one or more chips which is configured to:
receive a Physical Downlink Control Channel (PDCCH) and a Physical Downlink Shared Channel (PDSCH) in a downlink in a serving cell, a PDSCH in the downlink in a non-serving cell other than the serving cell, and a physical channel in a link between terminal devices in the non-serving cell; and
decode the PDSCH in the downlink of the non-serving cell prior to transmission and reception in the link between the terminal devices in the non-serving cell, in a case that the terminal device is configured to perform the transmission and the reception,
wherein the PDSCH in the downlink of the non-serving cell carries a system information block 18 indicating a pool of Device to Device (D2D) resources reserved in the non-serving cell, and a part of the D2D resources is used for the transmission in the link in the non-serving cell.

10. The integrated circuit according to claim 9, wherein a PDCCH in the downlink in the serving cell is used for carrying first information to which Cyclic Redundancy Check (CRC) parity bits scrambled with a System Information-Radio Network Temporary Indentifier (SI-RNTI) are attached, and
a PDCCH in the downlink in the non-serving cell is used for carrying second information to which CRC parity bits scrambled with the SI-RNTI are attached.

11. The integrated circuit according to claim 10, wherein the first information is used for scheduling of the PDSCH in the downlink in the serving cell, and the second information is used for scheduling of the PDSCH in the downlink in the non-serving cell.

12. The integrated circuit according to claim 9, wherein
the set of one or more chips is further configured to receive a PDCCH in a common search space in the downlink of the non-serving cell, which PDCCH carries information to be used for scheduling of the PDSCH in the downlink in the non-serving cell, and
the PDSCH in the downlink in the non-serving cell carries a system information block.

\* \* \* \* \*